(12) United States Patent
Nakahara

(10) Patent No.: US 8,059,186 B2
(45) Date of Patent: Nov. 15, 2011

(54) CAMERA HAVING A FOCUS ADJUSTING SYSTEM AND A FACE RECOGNITION FUNCTION

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 574 days.

(21) Appl. No.: 11/958,578

(22) Filed: Dec. 18, 2007

(65) Prior Publication Data

US 2008/0143866 A1    Jun. 19, 2008

(30) Foreign Application Priority Data

Dec. 19, 2006    (JP) .................................. 2006-340623

(51) Int. Cl.
*G02B 7/28*    (2006.01)
*H04N 5/232*    (2006.01)

(52) U.S. Cl. ..................................... 348/345; 348/222.1

(58) Field of Classification Search .......... 348/345–357, 348/222.1
See application file for complete search history.

(56) References Cited

U.S. PATENT DOCUMENTS

| | | | |
|---|---|---|---|
| 6,928,241 B2 | 8/2005 | Hirai | |
| 7,242,434 B2 | 7/2007 | Sugimoto et al. | |
| 7,791,668 B2 | 9/2010 | Maeda | |
| 2003/0071908 A1* | 4/2003 | Sannoh et al. ................. | 348/345 |
| 2004/0052514 A1 | 3/2004 | Hirai | |
| 2004/0207743 A1 | 10/2004 | Nozaki et al. | |
| 2005/0088538 A1* | 4/2005 | Nozaki et al. ............. | 348/229.1 |
| 2005/0270410 A1* | 12/2005 | Takayama ..................... | 348/345 |
| 2006/0012702 A1* | 1/2006 | Kawahara et al. ............ | 348/345 |
| 2006/0028576 A1* | 2/2006 | Ito ................................ | 348/345 |
| 2006/0055813 A1 | 3/2006 | Nakata et al. | |
| 2006/0078323 A1 | 4/2006 | Nakahara | |
| 2006/0104622 A1 | 5/2006 | Nakata | |
| 2007/0030381 A1* | 2/2007 | Maeda ........................ | 348/345 |

FOREIGN PATENT DOCUMENTS

| | | | |
|---|---|---|---|
| JP | 2000-147368 | | 5/2000 |
| JP | 2002-258344 | * | 9/2002 |
| JP | 2001-208959 | | 8/2003 |
| JP | 2004-102135 | | 4/2004 |
| JP | 2004-317699 | | 11/2004 |
| JP | 2006-201282 | | 8/2006 |

(Continued)

OTHER PUBLICATIONS

English language Abstract of JP 2006-208443, Aug. 10, 2006.
U.S. Appl. No. 11/953,311 to Nakahara, filed Dec. 10, 2007.
U.S. Appl. No. 11/847,554 to Nakahara, filed Aug. 30, 2007.

(Continued)

*Primary Examiner* — David Ometz
*Assistant Examiner* — Dwight C Tejano
(74) *Attorney, Agent, or Firm* — Greenblum & Bernstein, P.L.C.

(57) ABSTRACT

A camera having a focus adjusting system and a face recognition function includes a photographing optical system; an image pickup device; a focus adjusting device which performs a focus search process in which the image pickup device captures object images at different positions while the focusing lens group moves between near and far extremities thereof to detect an in-focus lens position; and a face recognition device for recognizing a face image based on the image signals, wherein if the face recognition device recognizes the face image and an in-focus state is previously achieved on the face image previously recognized, the focus adjusting device determines a range of movement of the focusing lens group based on sizes and positions of the face image captured when the in-focus state was previously achieved and the face image currently recognized on a picture plane.

9 Claims, 15 Drawing Sheets

FOREIGN PATENT DOCUMENTS

| | | |
|---|---|---|
| JP | 2006-208443 | 8/2006 |
| JP | 2006-208558 | 8/2006 |
| JP | 2006-319596 | 11/2006 |

OTHER PUBLICATIONS

Japanese Official Action in Japanese Patent Application No. 2006-340623, mailed Mar. 22, 2011, (and English language translation).

* cited by examiner

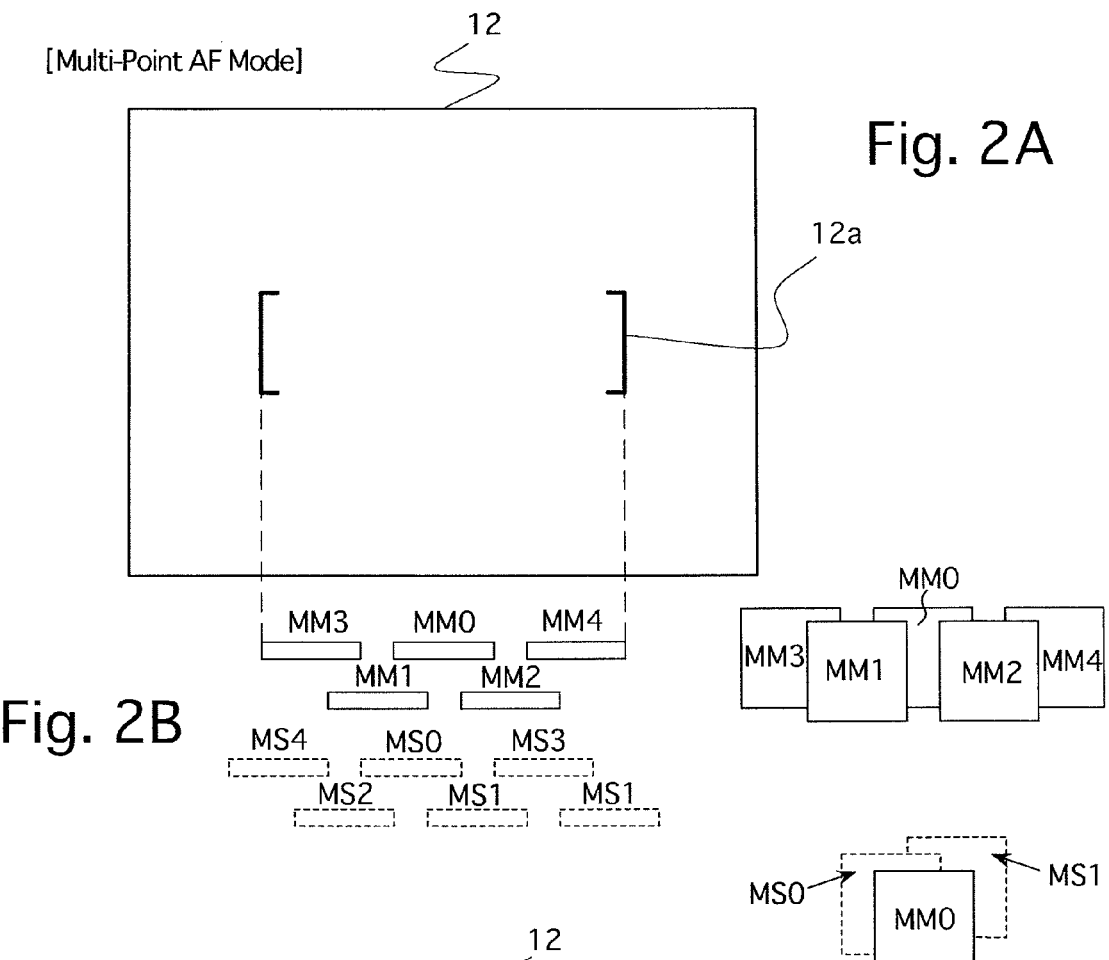
Fig. 2A
Fig. 2B
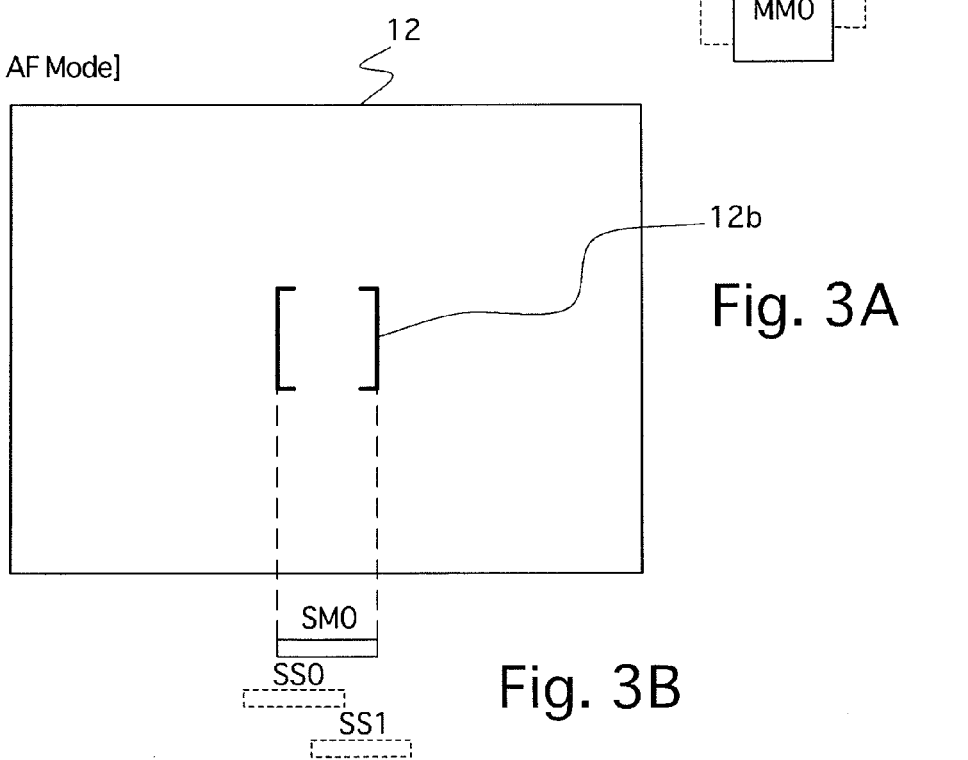
Fig. 3A
Fig. 3B

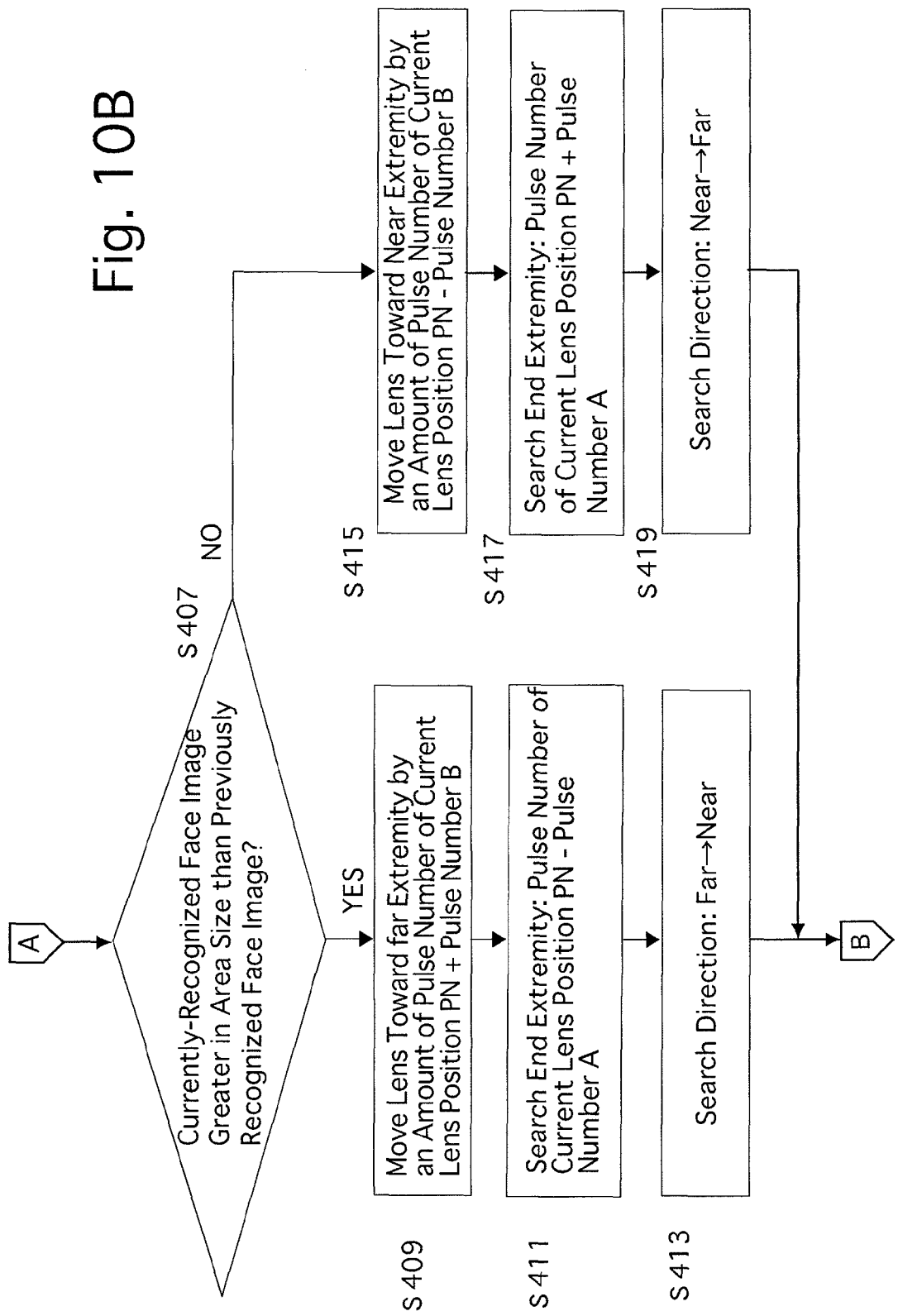

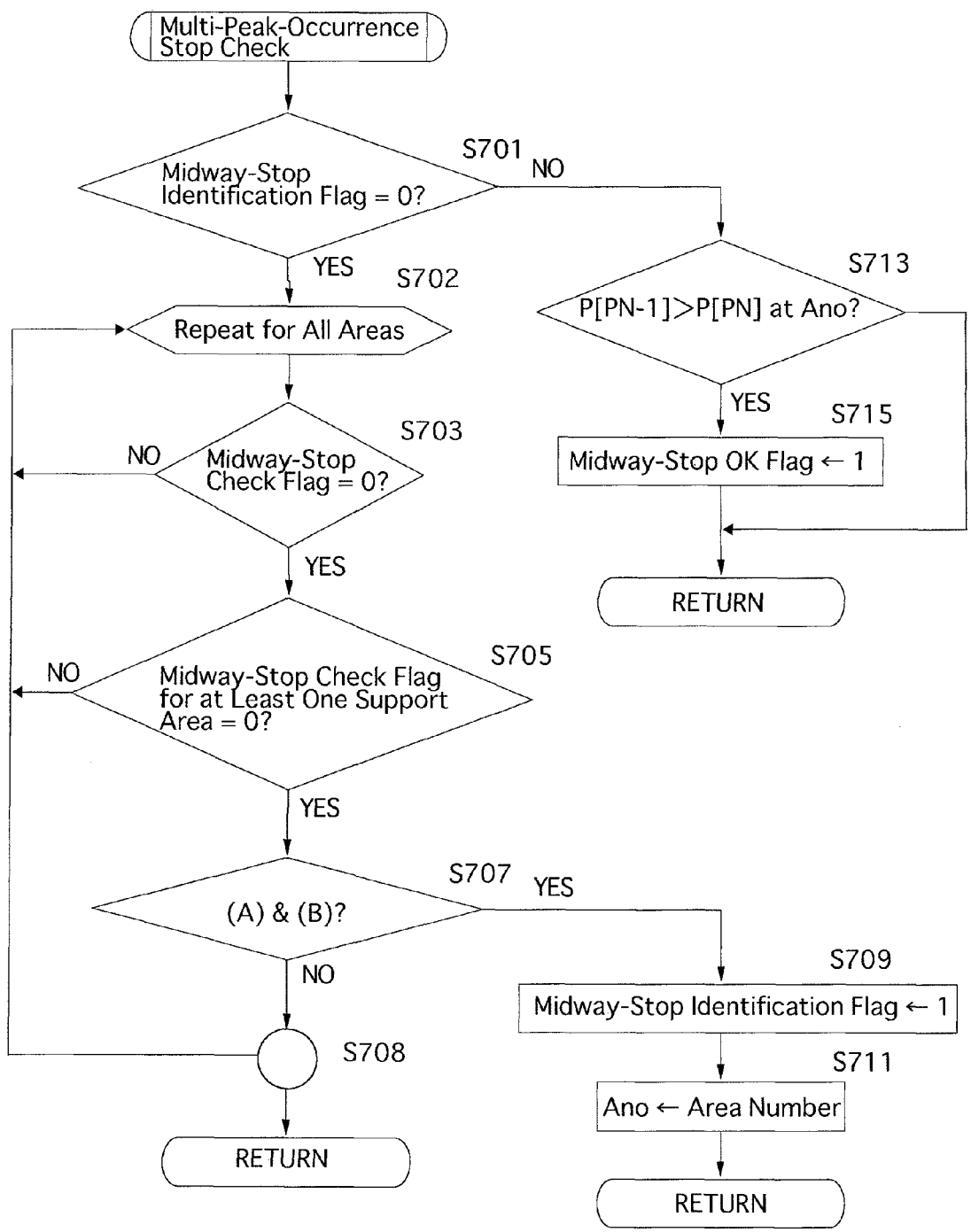

CAMERA HAVING A FOCUS ADJUSTING SYSTEM AND A FACE RECOGNITION FUNCTION

BACKGROUND OF THE INVENTION

1. Field of the Invention

The present invention relates to a camera having a contrast-detection type focus adjusting system and a face recognition function.

2. Description of the Prior Art

Conventional digital cameras with a contrast-detection type focus adjusting system (focusing system) which captures images consecutively while performing a focus search operation, i.e., while moving the focusing lens group along the optical axis thereof from a search start extremity, which is one of the infinite focus position and the closest (shortest) focus position, to a search end extremity (the other of the infinite focus position and the closest focus position) after moving the focusing lens group to the search start extremity to detect an in-focus position based on contrasts of the captured images, are known in the art. Among such digital cameras, a type of digital camera having a face recognition function is known in the art. This function recognizes one or more faces (human faces) from the aforementioned captured images, detects contrasts of the faces and brings all the faces into focus (into a depth of focus). This type of digital camera is disclosed in Japanese unexamined patent publication No. 2006-208443.

However, in this conventional type of digital camera having a face recognition function, in the case where the focus search operation is performed upon a face being recognized and subsequently the release button is again depressed half way after focus is achieved on this recognized face, the focus search operation is performed again in the same manner as the initial focus search operation in which the focusing lens group is initially moved back to the search start extremity (the near extremity or the far extremity) and thereupon moved from the search start extremity toward the search end extremity, and accordingly, it takes time to bring an object image which includes the recognized face image into focus.

SUMMARY OF THE INVENTION

The present invention provides a camera having a contrast-detection type focus adjusting system and a face recognition function, wherein, in the case where the focus search operation is performed upon a face being recognized and focus is achieved on this recognized face, the range of movement of the focusing lens group in the focus search operation is limited to a narrow range based on the result of the face recognition when the subsequent focus search operation is performed to thereby achieve a reduction in time required for focus adjustment.

According to an aspect of the present invention, a camera is provided having a focus adjusting system and a face recognition function, including a photographing optical system including a focusing lens group movable along an optical axis; an image pickup device; a focus adjusting device which performs a focus search process in which the image pickup device is activated to capture an object image at each of a plurality of different positions of the focusing lens group in the optical axis direction while the focusing lens group is moved along the optical axis direction to detect a position of the focusing lens group in the optical axis direction as an in-focus lens position based on image signals of the object images obtained at the plurality of different positions of the focusing lens group, and in which the focusing lens group is moved to the in-focus lens position detected by the focus search process; and a face recognition device for recognizing a face image based on the image signals. In the case where the face recognition device recognizes the face image and in the case where an in-focus state was previously achieved on the face image previously recognized by the face recognition device, the focus adjusting device determines a range of movement of the focusing lens group in the focus search process based on sizes and positions of the face image captured when the in-focus state was previously achieved and the face image currently recognized by the face recognition device on a picture plane.

It is desirable for the face recognition device to recognize the face image and an in-focus state to be previously achieved on the face image previously recognized by the face recognition device as a result of an AF process being performed upon the focus adjusting device receiving an AF start command.

It is desirable for the focus adjusting device to determine the range of movement of the focusing lens group in the focus search process when a lapse of time since the previous focus achievement is shorter than a predetermined period of time.

Upon an area of the face image recognized by the face recognition device becoming greater than an area of the previously-recognized face image by a predetermined amount, it is desirable for the focus adjusting device to determine the range of movement of the focusing lens group as a limited range from a position closer to the near extremity than a current stop position of the focusing lens group by a first predetermined amount to a position closer to the far extremity than the current stop position of the focusing lens group by a second predetermined amount which is smaller than the first predetermined amount.

It is desirable for the focus adjusting device to perform the focus search process so that the focus lens group moves in a direction from the far side toward the near side within the limited range.

Upon an area of the face image recognized by the face recognition device becoming smaller than an area of the previously-recognized face image by at least a predetermined amount, it is desirable for the focus adjusting device to determine the range of movement of the focusing lens group as a limited range from a position closer to the far extremity than a current stop position of the focusing lens group by a first predetermined amount to a position closer to the near extremity than the current stop position of the focusing lens group by a second predetermined amount which is smaller than the first predetermined amount.

It is desirable for the focus adjusting device to perform the focus search process so that the focus lens group moves in a direction from the near side toward the far side within the limited range.

In the case where the focus search process previously performed is performed on the face image recognized by the face recognition device, it is desirable for the focus adjusting device to determine the range of movement of the focusing lens group in the focus search process when a center of the currently-recognized face image is located within a predetermined range from a center of the previously-recognized face image.

It is desirable for the focus adjusting device to perform the focus search operation so that the focusing lens group moves over an entire range of movement thereof in the case where the focus adjusting device fails to detect the in-focus lens position of the focusing lens group within the range of movement of the focusing lens group that is determined by the focus adjusting device.

It is desirable for the photographing optical system to include a zoom lens, and for the camera to include a compensating device which corrects a size of a face image area of the previously-recognized face image and a size of a face image area of the currently-recognized face image according to a focal length at a previous in-focus state and a current focal length of the zoom lens, respectively, when the size of the face image area of the currently-recognized face image and the size of the face image area of the previously-recognized face image are compared with each other.

In an embodiment, a digital camera having a face recognition function is provided, including a photographing optical system including a focusing lens group movable along an optical axis; a focus adjusting device which captures an object image via an image pickup device at each of a plurality of different positions of the focusing lens group in the optical axis direction while moving the focusing lens group along the optical axis to detect a position thereof as an in-focus lens position based on image signals of the object images obtained at the plurality of different positions, and which moves the focusing lens group to the in-focus lens position; and a face recognition device for recognizing a face image based on the image signals. In the case where the face recognition device recognizes the face image and an in-focus state is previously achieved on the face image previously recognized by the face recognition device, the device determines a range of the step-wise movement of the focusing lens group based on sizes and positions of the face image captured when an in-focus state is previously achieved and the face image currently recognized by the face recognition device.

As described above, according to the present invention, in the case where a face image is recognized and focus is achieved on this face image, the range of movement of the focusing lens group for the subsequent focus search process is determined in accordance with variations in area sizes and positions of the face image previously recognized and focused and the face image currently recognized when the subsequent focus search process is performed, which makes it possible to achieve a reduction of the time required for the subsequent focus search process.

The present disclosure relates to subject matter contained in Japanese Patent Application No. 2006-340623 (filed on Dec. 19, 2006) which is expressly incorporated herein in its entirety.

BRIEF DESCRIPTION OF THE DRAWINGS

The present invention will be discussed below in detail with reference to the accompanying drawings, in which:

FIGS. 2A and 2B are diagrammatic sketches showing the relationship between the light receiving surface of an image pickup device and a plurality of focus detection areas on the light receiving surface in the digital camera in a multi-point AF mode, wherein FIG. 2A shows a focus frame in which the plurality of detection areas are distributed, and FIG. 2B shows the relationship between the plurality of focus detection areas and an associated plurality of support areas;

FIGS. 3A and 3B are diagrammatic sketches showing the relationship between the light receiving surface of the image pickup device and a single focus detection area on the light receiving surface in the digital camera in a spot AF mode, wherein FIG. 3A shows a focus frame in which the single focus detection area is positioned, and FIG. 3B shows the relationship between the single focus detection area and associated support areas;

FIGS. 4A, 4B and 4C are diagrammatic sketches showing different manners of indication of a focus detection area for comparison, wherein FIG. 4A shows a focus frame which indicates a focus detection area in the multi-point AF mode, FIG. 4B shows a focus frame which indicates a focus detection area in the spot AF mode, and FIG. 4C shows a focus frame which indicates a focus detection area in the face recognition AF mode;

FIGS. 10A and 10B show a flow chart having a sub-routine "first focus initializing process" and a sub-routine "second focus initializing process", each of which is performed in the contrast AF process shown in FIG. 7;

FIGS. 12A and 12B are illustrations showing the relationship among the light receiving surface, an object image and a face recognition area, wherein FIG. 12A shows the case where a face image has been recognized in the previous contrast AF process and FIG. 12B shows the case where a face image has been recognized in the current contrast AF process;

FIG. 16 is a flow chart showing a sub-routine "multi-peak-occurrence stop check process" performed in the latter half of the peak check process shown in FIG. 14.

DESCRIPTION OF THE PREFERRED EMBODIMENT

Figure 1:
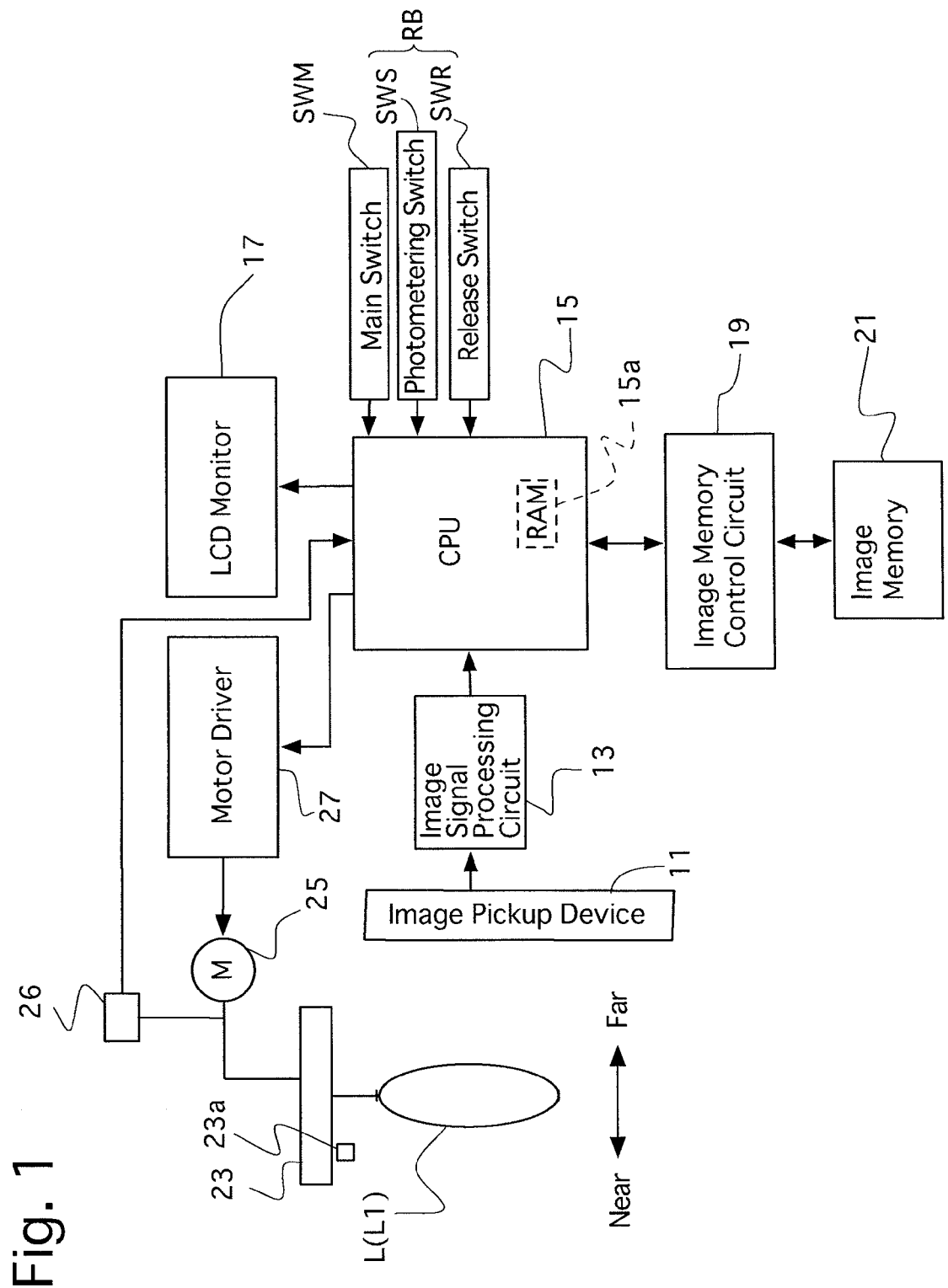
FIG. 1 is a block diagram of elements of an embodiment of a digital camera to which a focus adjusting system according to the present invention is applied, showing a basic configuration of the digital camera.

FIG. 1 is a block diagram of elements of an embodiment of a digital camera having a contrast AF type of focus adjusting system (focusing system) to which the present invention is applied, showing a basic configuration of the digital camera.

This digital camera is provided with a photographing lens (photographing optical system) L including a focusing lens group L1, and an image pickup device (CCD image sensor) 11 serving as an imaging device. An object image is formed on a light receiving surface (picture plane) 12 (see FIGS. 2 and 3) of the image pickup device 11 via the photographing lens L. The image pickup device 11 includes a large number of pixels (photoelectric transducing elements) arranged in a two-dimensional matrix at predetermined intervals. The digital camera is further provided with an image signal processing circuit 13, a CPU (comparing device/compensating device/focus adjusting device) 15, an LCD monitor 17, an image memory control circuit 19, and an image memory 21. Each pixel of the image pickup device 11 converts the incident light of an object image thereon into an electrical charge, and the electrical charges are accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal to output digital image data to the CPU 15. Namely, image data to which a predetermined process has been given and converted into digital image data in units of pixels are output to the CPU 15. The CPU 15 converts the input image data into an image signal capable of being indicated on the LCD monitor 17 to visually indicate the image data as an image on the LCD monitor 17 in a through mode (monitoring mode). When the AF process (contrast AF process) is performed, the CPU 15 captures the image data and temporarily stores the image data thus captured in an internal RAM (image cache memory) 15a of the CPU 15 to process the image data when the contrast AF process is performed. In an image recording mode, the CPU 15 converts the input image data into image data having a predetermined format to write this image data into the image memory 21 via the image memory control circuit 19.

CPU 15 performs the contrast AF process upon receiving an AF start command. In the present invention, an AF start command is sent upon a shutter release button RB being depressed half way so that a photometering switch SWS is turned ON. In the normal contrast AF process, upon a photometering switch SWS which is connected to the CPU 15 being turned ON, the CPU 15 performs a focus search process. Specifically, in this focus search process, the CPU 15 captures images consecutively via the image pickup device 11 while performing a focus search operation, i.e., while moving the focusing lens group L1 stepwise from the closest (shortest) focus position (near extremity/position for bringing an object at the shortest distance in working range into focus) to the infinite focus position (far extremity/position for bringing an object at infinity into focus), or vice versa, stores the captured images in an internal RAM 15a of the CPU 15, and detects the contrasts (contrast values) of the captured images in each focus detection area. Thereafter, a peak contrast value is detected in each focus detection area to detect the position of the focusing lens group L1 at which this peak contrast value is obtained, i.e., an in-focus lens position of the focusing lens group L1 is obtained. Thereupon, the focusing lens group L1 is moved to the in-focus lens position thus obtained. During the focus search process also, the captured image signal is indicated as an image on the LCD monitor 17 in the through mode.

Although not shown in detail in the drawings, primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal. Note that a typical arrangement (Bayer array) is adopted as the arrangement of the primary-color filters, and four pixels (a 2 by 2 matrix of pixels) in each square are treated as one pixel block.

The digital camera is provided with different contrast AF modes, i.e., a face recognition AF mode, a multi-point AF mode, and a spot AF mode. In the face recognition AF mode, a face image is recognized and brought into focus. In the multi-point AF mode, with the face recognition function not activated, a focus state is detected on each of a plurality of focus detection areas, and one of the plurality of focus detection areas is selected as an effective focus detection area. In the spot AF mode, with the face recognition function not activated, a focus state is detected only on one of the plurality of focus detection areas. These three AF modes can be selected by a known device, e.g., by operating a hand-operated mode dial provided on the digital camera.

FIG. 2A and 2B show the relationship between five focus detection areas MM0, MM1, MM2, MM3 and MM4 and six support areas MS0, MS1, MS2, MS3, MS4 and MS5 which support these five focus detection areas, as an example of the light receiving surface (imaging surface) 12 of the image pickup device 11 provided with a plurality of focus detection areas for multi-point AF mode. FIG. 2A shows a focus detection area 12a (wide focus detection area; shown by left and right square brackets in FIGS. 2 and 4A) which includes the five focus detection areas MM0, MM1, MM2, MM3 and MM4 and the six support areas MS0, MS1, MS2, MS3, MS4 and MS5, and FIG. 2B schematically shows a state of overlapping among the five focus detection areas MM0, MM1, MM2, MM3 and MM4 and the six support areas MS0, MS1, MS2, MS3, MS4 and MS5.

In the present embodiment of the digital camera, the focus detection area MM1 overlaps each of the two focus detection areas MM0 and MM3 adjacent to the focus detection area MM1, and the focus detection area MM2 overlaps each of the two focus detection areas MM0 and MM4 adjacent to the focus detection area MM2. Additionally, the two support areas MS0 and MS1 overlap the focus detection area MM0 from the laterally opposite sides thereof, respectively, while overlapping each other; the two support areas MS0 and MS2 overlap the focus detection area MM1 from the laterally opposite sides thereof, respectively, while overlapping each other; the two support areas MS1 and MS3 overlap the focus detection area MM2 from the laterally opposite sides thereof, respectively, while overlapping each other; the two support areas MS2 and MS4 overlap the focus detection area MM3 from the laterally opposite sides thereof, respectively, while overlapping each other; and the two support areas MS3 and MS5 overlap the focus detection area MM4 from the laterally opposite sides thereof, respectively, while overlapping each other.

The overlapping and supplemental relationship between the five focus detection areas MM0, MM1, MM2, MM3 and MM4 and the six support areas MS0, MS1, MS2, MS3, MS4 and MS5 is as follows.

The focus detection area MM0 is supported by the two support areas MS0 and MS1, the focus detection area MM1 is supported by the two support areas MS0 and MS2, the focus detection area MM2 is supported by the two support areas MS1 and MS3, the focus detection area MM3 is supported by the two support areas MS2 and MS4, and the focus detection area MM4 is supported by the two support areas MS3 and MS5.

The focus detection area MM0 and the two support areas MS0 and MS1 are used as a group of focus detection areas for detecting a focus state, the focus detection area MM1 and the two support areas MS0 and MS2 are used as a group of focus detection areas for detecting a focus state, the focus detection area MM2 and the two support areas MS1 and MS3 are used as a group of focus detection areas for detecting a focus state, the focus detection area MM3 and the two support areas MS2 and MS4 are used as a group of focus detection areas for detecting a focus state, and the focus detection area MM4 and the two support areas MS3 and MS5 are used as a group of focus detection areas for detecting a focus state.

FIGS. 3A and 3B show the relationship between a focus detection area SM0 and two support areas SS0 and SS1 which support the focus detection area SM0, as an example of the light receiving surface (imaging surface) 12 of the image pickup device 11 provided with a single focus detection area in the spot AF mode. FIG. 3A shows a focus detection area 12b (narrow focus detection area; shown by left and right square brackets in FIGS. 3A and 4B) which includes the focus detection area SM0 and the two support areas SS0 and SS1, and FIG. 3B schematically shows a state of overlapping among the focus detection area SM0 and the two support areas SS0 and SS1.

In the present embodiment of the digital camera, each support area (MS0 through MS5 and SS0 and SS1) is used to improve the accuracy of the associated overlapping focus detection area (MM0 through MM4 and SM0), i.e., to improve the accuracy in detection of contrast of the object image included in each focus detection area and the associated one support area (that include the overlapping portion therebetween), and is not used to make a selection of focus detection areas MS0 through MS4.

Figure 4A:
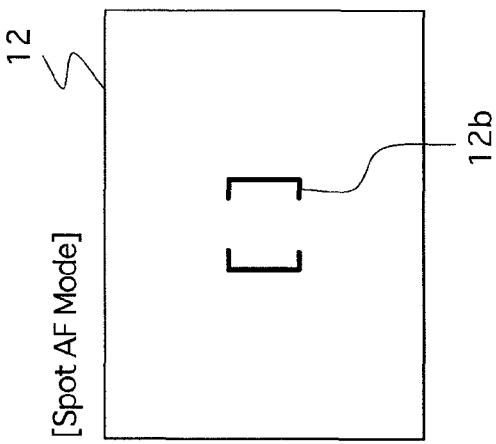
Figure 4B:
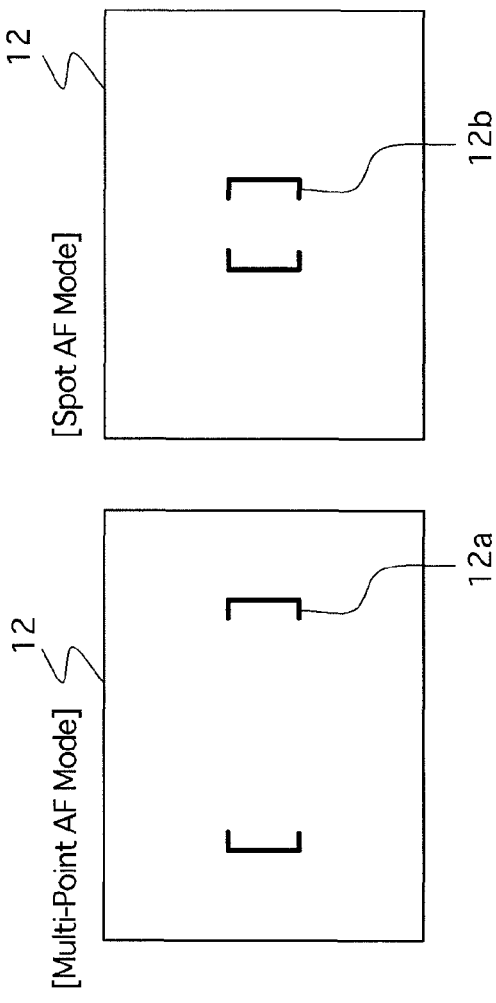
Figure 4C:
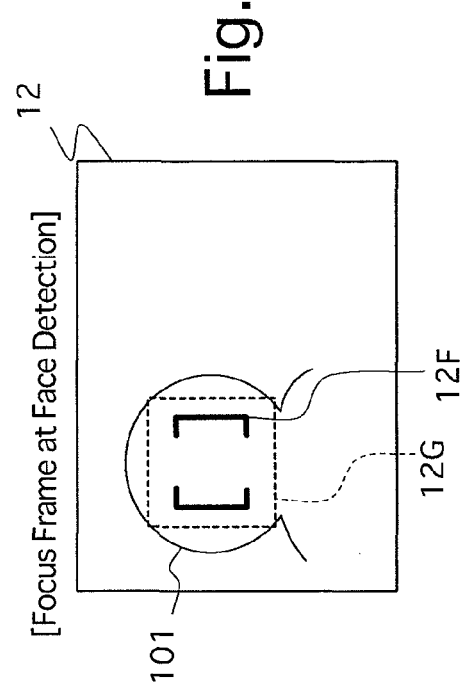

FIG. 4A shows the relationship between the light receiving surface 12 and the focus detection area 12a in the multi-point AF mode, FIG. 4B shows the relationship between the light receiving surface 12 and the focus detection area 12b in the spot AF mode, and FIG. 4C shows the relationship between the light receiving surface 12 and a focus detection area 12F in the face recognition AF mode. In the present embodiment of the digital camera, the focus detection area 12b that is used in the spot AF mode is narrower than the focus detection area 12a that is used in the multi-point AF mode. Although the focus detection area 12F that is used in the face recognition AF mode is substantially identical in size to the focus detection area 12b, the position of the focus detection area 12b on the light receiving surface 12 remains unchanged, whereas the position of the focus detection area 12F changes depending on the position of a face image 101 on the light receiving surface 12.

The read-out image signal is processed according to a known algorithm. For instance, in the contrast AF process, an operation for determining the difference between the intensity between a pixel block (the sum of brightness of four pixels) and the intensity of another pixel block positioned one pixel-block away from the previous pixel block in each focus detection area MM0 through MM4 is repeated, and the differences thus determined are summed up to be regarded as the contrast value on this focus detection area at the current position of the focusing lens group L1.

In the contrast AF process in the present embodiment of the digital camera, a combination of a CCD high-speed drive mode and a small pixel-count addition mode, and a combination of a CCD low-speed drive mode and a large pixel-count addition mode (VGA) are switched according to the brightness of an object to be photographed.

In the case of a high-brightness object, the above described control of the image pickup device 11 is carried out in the small pixel-count addition mode in the case where the image pickup device 11 operates in the CCD high-speed drive mode (in which the exposure time of the image pickup device 11 is short).

In the case of a low-brightness object, the image pickup device 11 operates in the CCD low-speed drive mode (in which the exposure time of the image pickup device is long) and in the large pixel-count addition mode, in which, e.g., the intensities of four pixel blocks (sixteen pixels in total) adjacent to one another are added up or the intensities of four-by-four pixels (sixteen pixels in total) centered on each pixel block are added up.

The digital camera has a function (face recognition function) of recognizing a face image from an object image captured by the image pickup device 11. More specifically, upon the commencement of the contrast AF process, the CPU 15 operates to capture an object image via the image pickup device 11 to write this captured object image as an image signal (image data) into the internal RAM 15a, and subsequently determines whether or not an image signal of a face image is included in the image signal written into the internal RAM 15a. The face recognition (face detection) is carried out according to a known method. Namely, in the face recognition, flesh color (skin color) or face feature points (e.g., eye points, nose points and mouth points) are detected or the contours of a person's face are extracted to recognize a face image in the entire image signal captured by the image pickup device 11. In the face recognition AF mode, upon recognizing a face image, the CPU 15 determines the position of an image area including the face image to set a focus detection area 12F with the center thereof coincident with the center of this image area, and determines an in-focus position (in-focus lens position of the focusing lens group L1) from the image signal of an object image included in the focus detection area 12F. In the face recognition AF mode, the size of the focus detection area 12F is fixed, and the position of the focus detection area 12F is set to be substantially centered with respect to a recognized face image. After a face image has been recognized in this manner, the focus search process is performed based on the image signal of an object image (image signal of a face image) formed in the focus detection area 12.

Figure 5A:
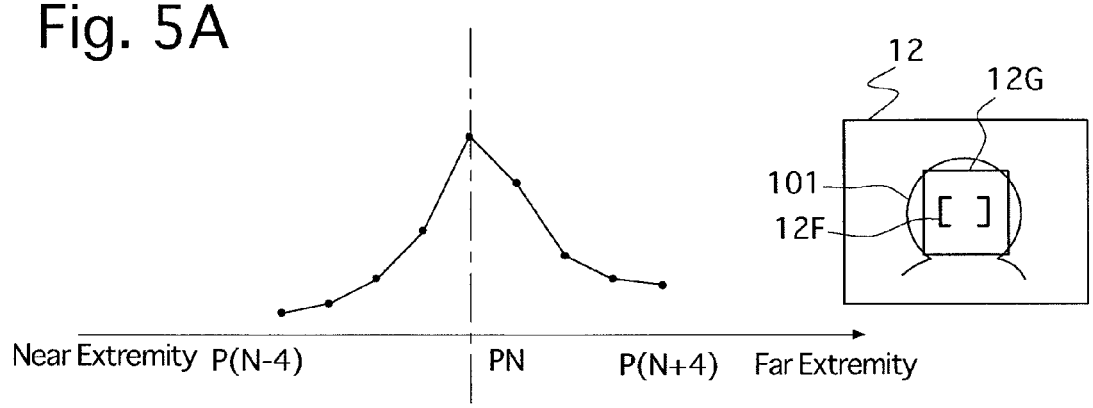
FIGS. 5A, 5B and 5C each show a graph showing the relationship between positions of the focusing lens group and contrast values when a face image is recognized and a diagrammatic sketch showing the relationship between the area of the recognized face image and the light receiving surface (imaging surface) of an image pickup device, and FIGS. 5B and 5C each show a manner of movement of the focusing lens group, wherein FIG. 5A diagrammatically illustrates a process of bringing the recognized face image into focus by the contrast AF process performed for the first time, and FIGS. 5B and 5C diagrammatically illustrate the subsequent process in the case where the recognized face image is large and small, respectively.
Figure 5B:
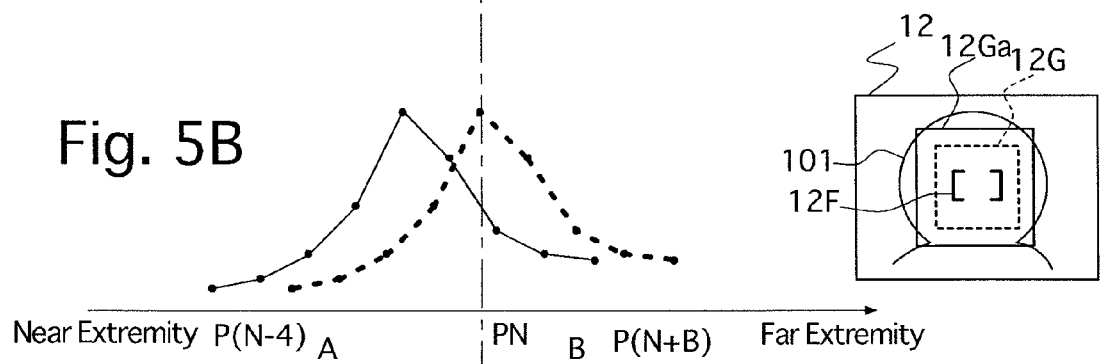
Figure 5C:
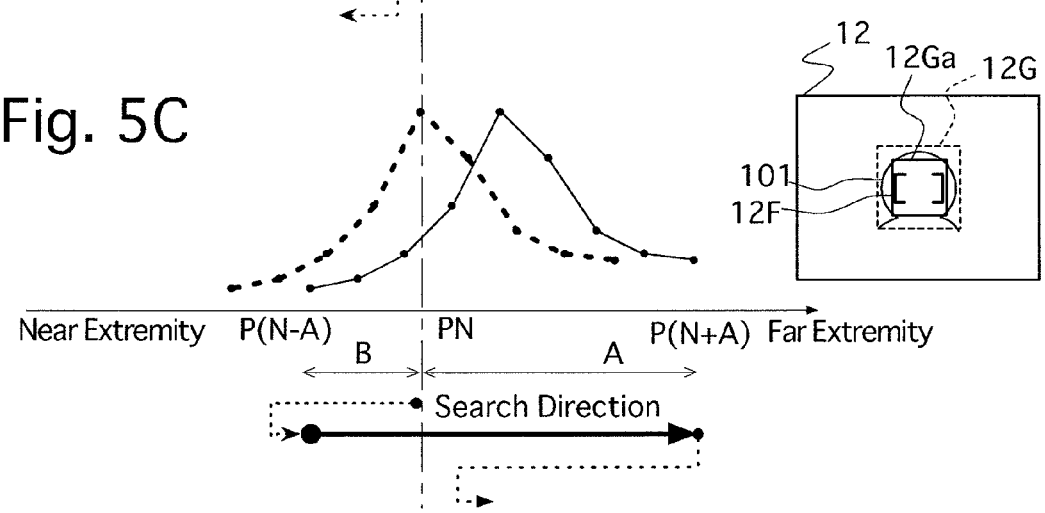

FIGS. 5A, 5B and 5C each show a graph showing the relationship between positions of the focusing lens group L1 and contrast values when the face image 101 is recognized and a diagrammatic sketch showing the relationship between a face image area 12G of the recognized face image 101 and the light receiving surface 12, and FIGS. 5B and 5C each further show a manner of movement of the focusing lens group L1. FIG. 5A diagrammatically illustrates a process of bringing the recognized face image 101 into focus by the contrast AF process performed for the first time, and FIGS. 5B and 5C diagrammatically illustrate the subsequent process in the case where the recognized face image 101 is large and small, respectively.

In the present embodiment of the digital camera, the position (lens position) of the focusing lens group L1 in the optical axis direction is detected using an origin sensor 23a with the closest focus position (near extremity) of the focusing lens group L1 being predetermined as a point of origin, and is counted as the number of drive pulses from this point of origin. The drive pulses are defined as, e.g., pulses output from an encoder 26 such as a photo-interrupter installed on the output shaft of the AF motor 25. Although several hundreds of pulses or more are usually necessary for driving the focusing lens group L1 from the closest focus position to the infinite focus position, it is assumed that several pulses or several dozen pulses are only necessary for driving the focusing lens group L1 (while capturing images) in a stepwise manner from the closest focus position to the infinite focus position in the contrast AF process in the present embodiment of the digital camera for the purpose of simplifying the description, and that one step corresponds to one drive pulse and one lens-position pulse.

In addition, in the present embodiment of the digital camera, the position of the focusing lens group L1 is represented by a lens-position pulse number (variable) PN which is incremented by one every time the encoder 26 outputs one pulse (drive pulse) when the AF motor 25 is driven in the direction from the closest focus position to the infinite focus position, and the lens-position pulse number PN is 0 when the focusing lens group L1 is positioned at the initial position thereof (closest focus position in the present embodiment of the digital camera). In either of the two cases where a focus search operation in which the focusing lens group L1 is moved from the closest focus position to the infinite focus position is performed and where a focus search operation in which the focusing lens group L1 is moved from the infinite focus position to the closest focus position is performed, the lens-position pulse number at the initial position of the focusing lens group L1 is 0, the lens-position pulse numbers are added up when the focusing lens group L1 is driven stepwise from the initial position thereof to another position, and a lens-position pulse number is subtracted from the lens-position pulse numbers thus added up step by step when the focusing lens group L1 is driven stepwise in the opposite direction toward the initial position thereof.

The CPU 15 recognizes an area corresponding to a person's face, i.e., the area of a face image, from the image signal output from the image signal processing circuit 13. The face recognition (face detection) is carried out according to the known method.

FIG. 5A shows a state where the face image 101 of a person to be photographed has been recognized by the focus search process performed for the first time and brought into focus. More specifically, FIG. 5A shows a state where the focus detection area 12F has been set upon the face image 101 being recognized in the image signal output from the image signal processing circuit 13, where the focus search process in which the focusing lens group L1 is driven from the near extremity toward the far extremity has been performed, and where a peak contrast value has been detected at the lens-position pulse number PN. The square frame designated by the reference mark 12G in FIG. 5A corresponds to the outline of the face image area 12G that includes the face image 101. The CPU 15 writes data on an image in the face image area 12G into the internal RAM 15*a*.

FIGS. 5B and 5C each show a state of the focus search process after the shutter release button RB is depressed half way (so that the photometering switch SWS is turned ON) within a predetermined period of time from the moment at which focus is achieved on the face image 101. Upon the photometering switch SWS being turned ON, firstly an image signal is input from the image pickup device 11 to recognize the face image 101, and a face image area 12Ga of the currently-recognized face image 101 is detected. Thereafter, the size of the face image area 12Ga of the currently-recognized face image 101 is compared with the size of the face image area 12G previously written in the internal RAM 15*b* to determine whether or not the face image area 12Ga of the currently-recognized face image 101 is greater in size than the face image area 12G previously written in the internal RAM 15*b*, e.g., from the magnitude of an area ratio of the face image area 12Ga of the currently-recognized face image 101 to the face image area 12G of the previously-recognized face image 101 after this area ratio is calculated. The number of pixels in the face image area 12Ga of the currently-recognized face image 101 can be compared with the number of pixels in the face image area 12G of the previously-recognized face image 101 to determine whether or not the face image area 12Ga of the currently-recognized face image 101 is greater in size than the face image area 12G of the previously-recognized face image 101.

When the face image area 12Ga of the currently-recognized face image 101 is greater than the face image area 12G of the previously-recognized face image 101 (when the area ratio becomes greater than 1), it can be presumed that the person of the face image 101 has come closer to the digital camera. Conversely, when the face image area 12Ga of the currently-recognized face image 101 is smaller than the face image area 12G of the previously-recognized face image 101 (when the area ratio becomes equal to or smaller than 1), it can be presumed that the person of the face image 101 has moved away from the digital camera. On this account, in the present embodiment of the digital camera, when the face image area 12Ga of the currently-recognized face image 101 is greater than the face image area 12G of the previously-recognized face image 101 (in the case as shown in FIG. 5B), the range of movement of the focusing lens group L1 in the focus search operation is determined to range between a lens position P(N−A) and a lens position P(N+B), wherein the lens position P(N−A) is located a distance of a first number of drive pulses A away from the lens position PN toward the near extremity of the focusing lens group L1 and the lens position P(N+B) is located a distance of a second number of drive pulses B away from the lens position PN toward the far extremity of the focusing lens group L1, and thereupon the focus search process in which the focusing lens group L1 is driven from the far extremity toward the near extremity is performed. Namely, the focus search process in which the focusing lens group L1 is driven in a direction to follow the moving object (the person of the face image 101) is performed. However, in this case, the first number of drive pulses A (for moving the focusing lens group L1 in a range (first range) of movement thereof on the near extremity side in the focus search operation) is greater than the second number of drive pulses B (for moving the focusing lens group L1 in a range (second range) of movement thereof on the far extremity side in the focus search operation) to widen the aforementioned first range of movement of the focusing lens group L1 since the person of the face image 101 is presumed to be coming closer to the digital camera.

Conversely, when the face image area 12Ga of the currently-recognized face image 101 is smaller than the face image area 12G of the previously-recognized face image 101 (in the case as shown in FIG. 5C), the range of movement of the focusing lens group L1 in the focus search operation is determined to range between a lens position P(N+A) to a lens position P(N−B), wherein the lens position P(N+B) is located a distance of a first number of drive pulses A away from the lens position PN toward the far extremity of the focusing lens group L1 and the lens position P(N−A) is located a distance of a second number of pulses B away from the lens position PN toward the near extremity of the focusing lens group L1. Namely, the focus search process in which the focusing lens group L1 is driven in a direction to follow the moving object (the person of the face image 101) is performed. However, in this case, the first number of drive pulses A (for moving the focusing lens group L1 in a range (first range) of movement thereof on the far extremity side in the focus search operation) is greater than the second number of drive pulses B (for moving the focusing lens group L1 in a range (second range) of movement thereof on the near extremity side in the focus search operation) to widen the aforementioned first range of movement of the focusing lens group L1 since the person of the face image 101 is presumed to be moving away from the digital camera.

In either case, the sum of the first number of drive pulses A and the second number of drive pulses B is the number of drive pulses for moving the focusing lens group L1 in the range of movement thereof in the focus search operation. Naturally, the sum of the first number of drive pulses A and the second number of drive pulses B is smaller than a number of pulses required for moving the focusing lens group L1 over the entire range of movement thereof in the focus search operation.

As described above, in the case where an AF process (contrast AF process) is performed immediately after a face image is recognized and brought into focus once, a reduction of the time required for the focus search operation is achieved since the range of movement of the focusing lens group L1 in the focus search operation is limited to a narrow range in accordance with variations in size of the recognized face image. Moreover, the moving distance of the focusing lens group L1 becomes short while the time required to achieve focus is reduced since the focus lens group L1 starts moving in the focus search operation from that one of the opposite limits of the range of movement of the focusing lens group L1 which is closer to the current lens position of the focusing lens group L1.

In the present embodiment of the digital camera, upon a peak contrast occurring during the focus search operation in the contrast AF process, the focus search operation can be terminated under predetermined conditions, which makes it possible to reduce the time for focus adjustment with no focusing error. The following two different processes are selectively performed according to different algorithms depending on the object brightness, specifically on predetermined conditions that an object to be photographed is luminous and bright and that an object to be photographed is luminous but dark. The different drive modes, i.e., the CCD high-speed drive mode, the CCD low-speed drive mode, the small pixel-count addition mode, and the large pixel-count addition mode, which are mentioned in the following description, are selected irrespective of the focus recognition function.

[In the Case of Bright Object]

The present embodiment of the digital camera operates in the CCD high-speed drive mode, the small pixel-count addition mode, and a single-peak-occurrence stop mode when the brightness of the object is high.

In the case of detecting contrasts of captured images when the brightness of the object is high in the small pixel-count addition mode, the exposure time of the image pickup device 11 is short and the sum of pixel additions is smaller than that in the case of detecting contrasts of captured images when the brightness of the object is low in the large pixel-count addition mode, so that there is a little possibility of contrasts outside of the selected detection area being picked up on one occasion and not picked up on another occasion. Accordingly, the focus search operation is terminated (during the progress thereof) upon a peak contrast occurring in any of the five focus detection areas MM0 through MM4 in the multi-point AF mode, and the focus search operation is terminated upon a peak contrast occurring in the focus detection area SM0 in the spot AF mode. Due to this operation terminating the focus search operation during the progress thereof, a further reduction in time required for focus adjustment can be achieved.

[In the Case of Dark Object]

The present embodiment of the digital camera operates in the CCD low-speed drive mode, the large pixel-count addition mode, and a multi-peak-occurrence stop mode when the brightness of the object is low.

In the case of detecting contrasts of captured images when the brightness of the object is low in the large pixel-count addition mode, the exposure time of the image pickup device 11 is long, so that it is often the case that contrasts outside of the selected detection area are picked up on one occasion and not picked up on another occasion due to hand shake (camera shake), or the like, during the focus search operation. Moreover, the number of pixel values increases due to the large pixel-count addition mode (VGA), and accordingly, it is often the case that contrasts outside of the selected detection area are picked up on one occasion and not picked up on another occasion and there is a high possibility of a false peak contrast occurring. To prevent this from occurring, in the present embodiment of the digital camera, the focus search operation is terminated immediately after a peak contrast occurs in any of the five focus detection areas MM0 through MM4 and a peak contrast occurs in either of the associated two support areas (MS0 and MS1, MS0 and MS2, MS1 and MS3, MS2 and MS4, or MS3 and MS5) at the same time in the multi-point AF mode, while the focus search operation is terminated immediately after a peak contrast occurs in the focus detection area SM0 and a peak contrast occurs in either of the two support areas SS0 and SS1 at the same time in the spot AF mode. The chances of a false peak contrast being detected are remote and the possibility of a focusing error occurring is low if the focus search operation is terminated at such a moment rather than terminated upon a peak contrast occurring in one of the five focus detection areas MM0 through MM4 in the multi-point AF mode.

The occurrence of a peak contrast in each support area MS0 through MS5, SS0 and SS1 used in the contrast AF process can be within the range of two or three successive pulse positions. In this case, a focus detection area or areas (MM0 through MM4 and SM0) which are to be supported, the closest focus position, some midway point between the closest focus position and the infinite focus position, or the farthest focus position can be selected.

[Direction of the Focus Search Operation]

In the case where the initial process is performed upon the power of the digital camera being turned ON or an in-focus state is not determined, a focus search process in which the direction of the focus search operation (the direction of movement of the focusing lens group L1 in the focus search operation) is set in the following manner is performed.

In the case where the focus detection area is wide or a plurality of focus detection areas are distributed in a wide range though one focus detection area is small, i.e., in the case of the multi-point AF mode, the direction of the focus search operation is limited to the direction from the closest focus position toward the infinite focus position regardless of the current stop position of the focusing lens group L1. Since it is sometimes the case that images of near and far objects are included in a plurality of focus detection areas, the near object is given priority for being brought into focus by limiting the direction of the focus search operation to the direction from the closest focus position toward the infinite focus position.

In the case where the focus detection area is small, e.g., in the case of the spot AF mode, the direction of the focus search operation is set to either the direction from the infinite focus position toward the closest focus position or the direction from the closest focus position toward the infinite focus position depending on the current stop position of the focusing lens group L1. In the spot AF mode, the chances of images of near and far objects being included in the focus detection area are low, and accordingly, the time for focus adjustment can be reduced by terminating the focus search operation upon a peak contrast occurring after the commencement of the focus search operation.

According to the above described focus search process, the time required to bring an object into focus for the first time after the power of the digital camera is turned ON is reduced. Although the direction of the focus search operation in the case where a face image is recognized can be determined by adopting any algorithm in the contrast AF process performed for the first time after the power of the digital camera is turned ON, it is desirable that the focusing lens group L1 start moving from the near extremity in the focus search operation because people (objects to be photographed) tend to be located in a relatively short distance range in the case of photographing people.

Figure 6:
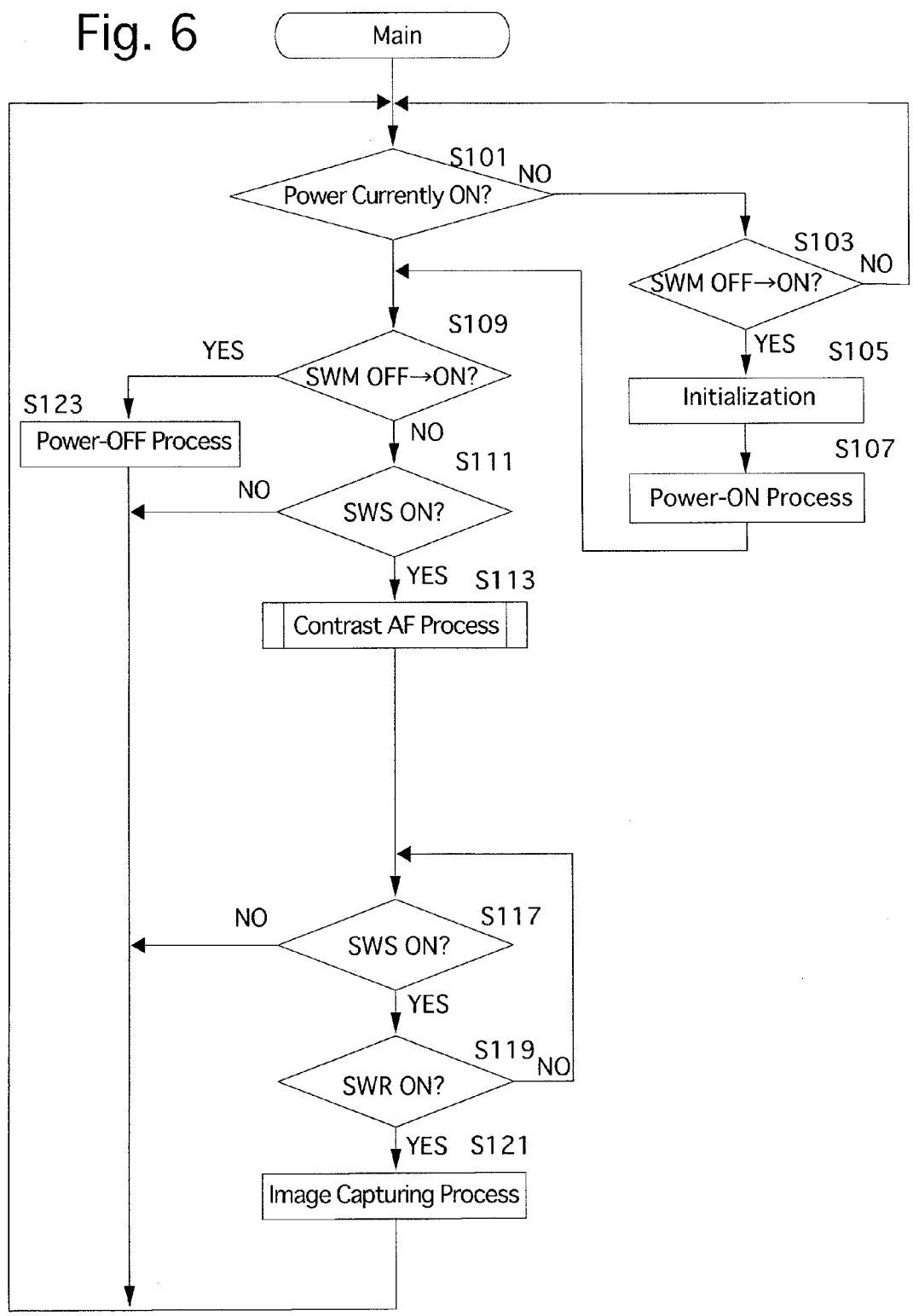
FIG. 6 is a flow chart showing an embodiment of a main process which is performed in the digital camera to which the present invention is applied.

Operations of the contrast AF process performed in the present embodiment of the digital camera will be discussed with reference to the flow charts shown in FIGS. 6 through 11 and 13 through 16 and the illustrations shown in FIGS. 12A and 12B that show relationship among the light receiving surface 12, the focus detection area 12G and face image 101. FIG. 6 is a flow chart showing an embodiment of a main process having a sequence of operating steps which is performed in this digital camera. Control enters this main process upon a battery (not shown) being loaded into the digital camera.

In the main process, firstly it is determined whether or not the power is currently ON (step S101). If the power is not currently ON (if NO at step S101), it is determined whether or not a main switch SWM has changed to the ON state from the OFF state (step S103). If the main switch SWM has not changed to the ON state from the OFF state (if NO at step S103), control returns to step S101. Namely, a main-switch check process consisting of the operations at steps S101 and S103 is repeated to determine whether or not the main switch SWM has changed to the ON state from the OFF state. If the main switch SWM has changed to the ON state from the OFF state (if YES at step S103), hardware/software initialization (initialization of the internal RAM 15a, ports, variables, etc.,) is performed (step S105), and a power-ON process in which the power is turned ON to supply power to various parts is performed (step S107), and control proceeds to step S109.

At step S109 it is determined whether or not the main switch SWM has changed to the ON state from the OFF state. If the main switch SWM has not changed to the ON state from the OFF state (if NO at step S109), it is determined whether or not a photometering switch SWS is ON (step S111). If the photometering switch SWS is not ON (if NO at step S111), control returns to step S101. Since control returns to step S101 in a state where the power is ON, it is determined at step S101 that the power is currently ON and control proceeds to step S109. Accordingly, during the time the power remains ON, control repeats a check process including the operations at steps S101 and S109 until the main switch SWM changes to the ON state from the OFF state or the photometering switch SWS is turned ON. Upon the main switch SWM changing to the ON state from the OFF state during the aforementioned check process, a power-OFF process is performed (step S123), and control returns to the aforementioned main-switch check process, which consists of the operations at steps S101 and S103.

Upon the photometering switch SWS being turned ON (if YES at step S111), a contrast AF process (see FIG. 7) is performed to bring a target object into focus by moving the focusing lens group L1 (step S113). Subsequently, it is determined whether or not the photometering switch SWS is ON (step S117). If the photometering switch SWS is ON (if YES at step S117), it is determined whether or not the shutter release button RB is fully depressed so that a release switch SWR is turned ON (step S119). If the release switch SWR is not ON (if NO at step S119), control returns to step S117 to repeat the operations at steps S117 and S119 to determined whether or not the photometering switch SWS and the release switch SWR are ON, respectively.

Upon the release switch SWR being turned ON (if YES at step S119), an image capturing process is performed (step S121), and control returns to step S101. If the photometering switch SWS is turned OFF (if NO at step S117), control simply returns to step S101.

The contrast AF process that is performed at step S113 will be hereinafter discussed in detail with reference to the flow chat shown in FIG. 7.

In the contrast AF process, firstly various variables, etc., are initialized (step S201). For instance, in this particular embodiment, each status (flag) is cleared (i.e., set to 0), contrast values are cleared, a lens-position pulse number PN is initialized (PN=0), the maximum contrast value is set to 0, the minimum contrast value is set to FFFFFFFF, a midway-stop identification (PerhapsOK) flag is cleared, a midway-stop OK (StopOK) flag is cleared, and a face partial AF search flag (FacePartialAF flag) is cleared.

Variables and others are defined as follows. Contrast values are those actually obtained from pixels in each focus detection area or support area.

Given that the lens-position pulse number PN is 0 when the focusing lens group L1 is positioned at the closest focus position that serves as the initial position of the focusing lens group L1, the lens-position pulse number PN is a variable which is incremented by one by the CPU 15 every time the encoder 26 outputs one pulse (drive pulse) when the AF motor 25 is driven in the direction toward the infinite focus position. When the AF motor 25 is driven to move the focusing lens group L1 in the direction toward the initial position thereof, the lens-position pulse number PN is decremented by one by the CPU 15 every time the encoder 26 outputs one pulse (drive pulse).

The maximum contrast value and the minimum contrast value are variables to which actually-obtained maximum and minimum contrast values are assigned respectively.

The midway-stop identification flag (PerhapsOK flag) is a flag for determining whether or not to identify a midway stop of the focus search operation. Specifically, the midway-stop identification flag "0" indicates a focus search operation without a midway stop and the midway-stop identification flag "1" indicates a focus search operation with a midway stop.

The midway-stop OK flag (StopOK flag) is a flag which enables or disables the focus search operation. Specifically, the midway-stop OK flags "0" and "1" disable and enable the focus search operation, respectively.

Figure 13:
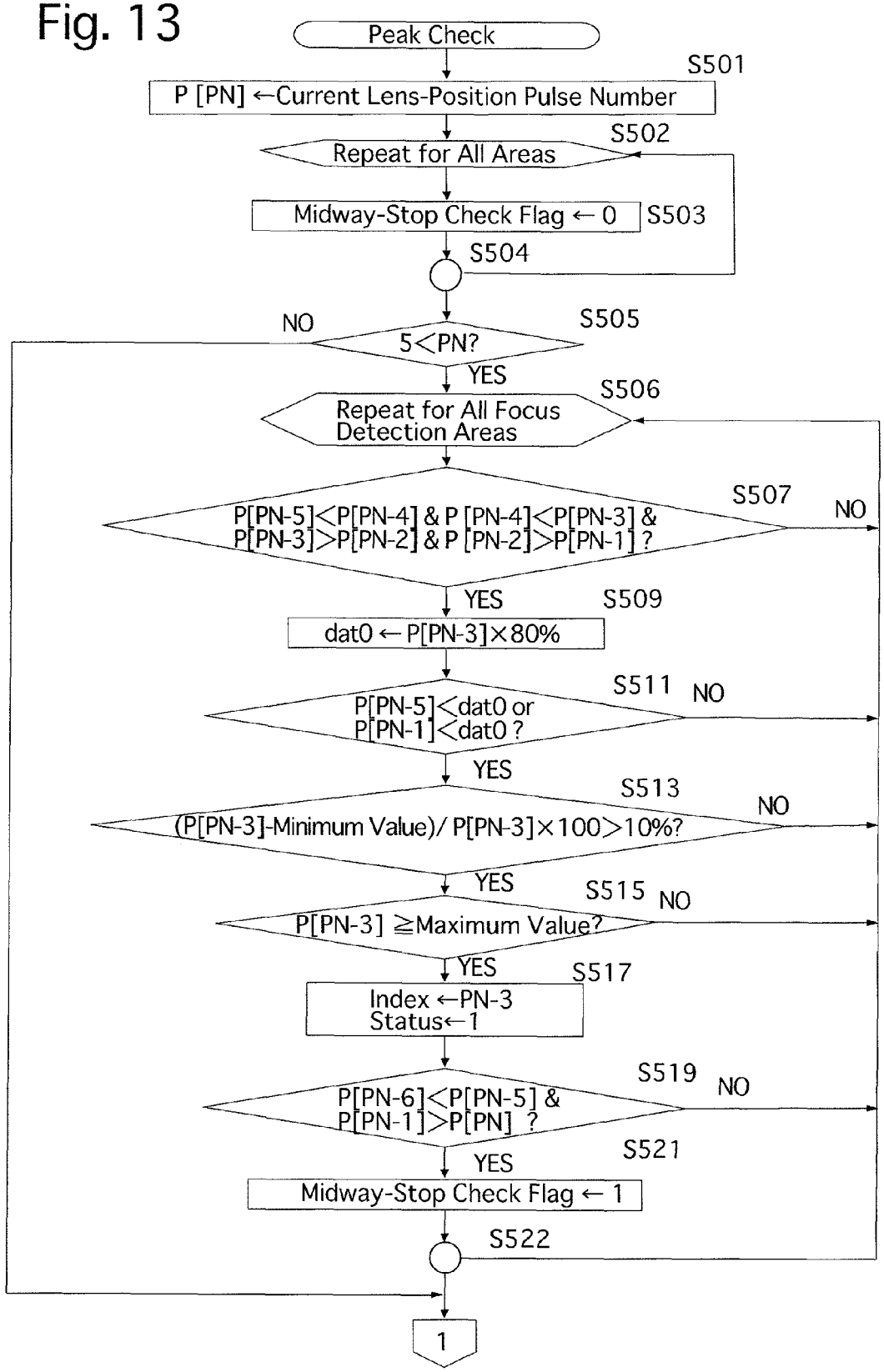
FIG. 13 is a flow chart showing the first half of a sub-routine "peak check process" performed in the contrast AF process shown in FIG. 7.
Figure 14:
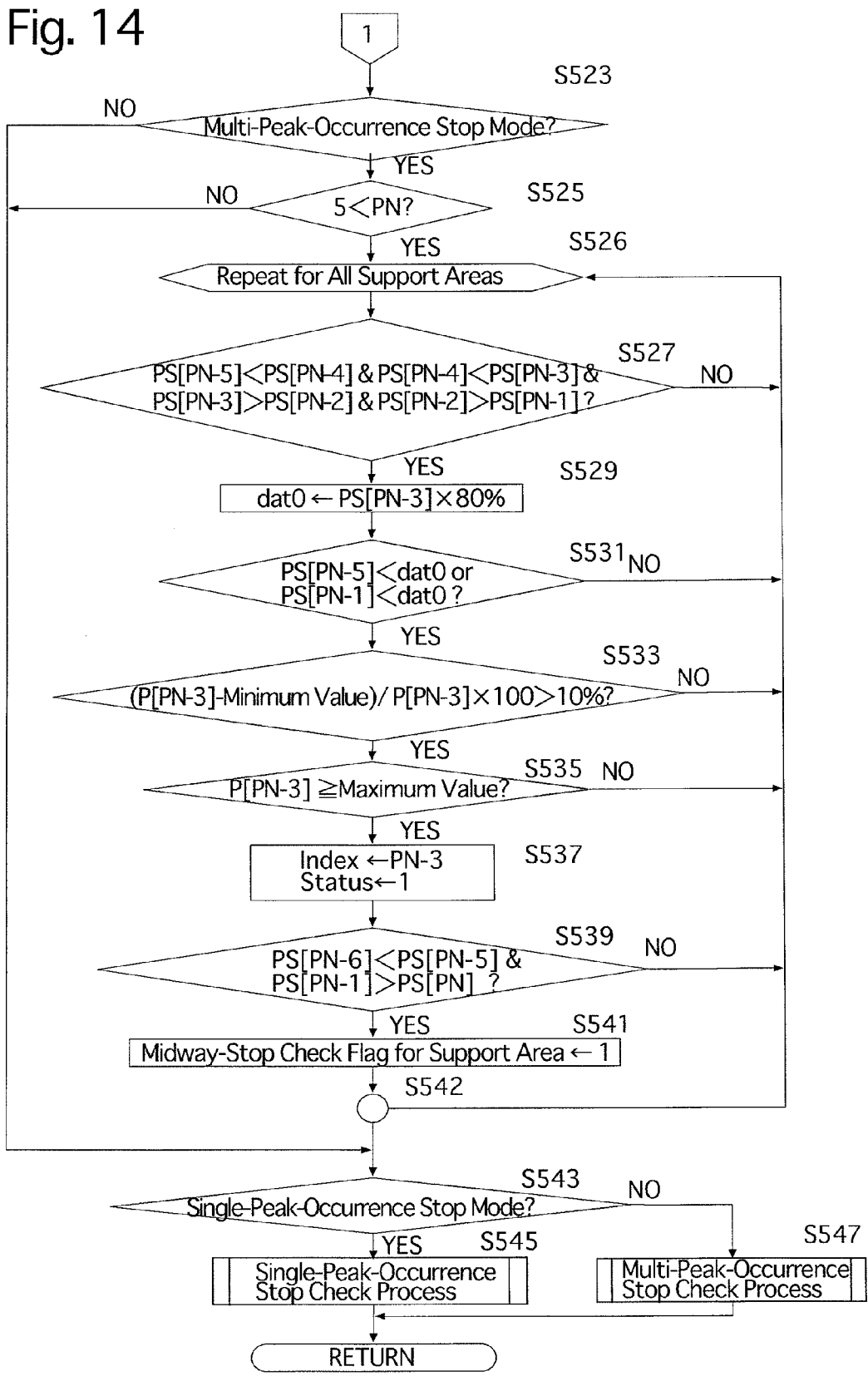
FIG. 14 is a flow chart showing the latter half of the sub-routine "peak check process" performed in the contrast AF process shown in FIG. 7.

A midway-stop check flag (StopCheck flag) is a flag which indicates whether or not to check conditions of the midway stop of the focus search operation (see FIGS. 13 and 14). Specifically, the midway-stop check flags "0" and "1" indicate not to check and to check conditions of the midway stop of the focus search operation, respectively.

A face partial AF search flag (FacePartialAF flag) is a flag for setting whether or not to perform the focus search operation partially over the range from the closest focus position to the infinite focus position as a result of face recognition. Specifically, the face partial AF search flags "0" and "1" indicate not to perform and to perform the focus search operation partially over the range from the closest focus position to the infinite focus position, respectively.

Subsequently, a face recognition process is carried out (step S202) and a midway stop method determining process (see FIG. 8) is performed (step S203). Namely, it is determined whether the focus search operation is terminated upon at least two peak contrasts occurring simultaneously in at least two areas (one focus detection area and at least one associated support area), respectively, or the focus search operation is terminated upon a peak contrast occurring in any of the five focus detection areas. A condition for determining the way to stop the focus search operation can be either the object brightness or a CCD drive mode of the image pickup device (CCD image sensor) 11 that operates in association with the object brightness.

Subsequently, a focus detection area determining process (see FIG. 9) is performed (step S204). In this process, if the face image 101 is recognized in the face recognition process at step S202, the position of the focus detection area 12 on the picture plane (corresponding to the light receiving surface 12) is set so that the center of the focus detection area 12 is substantially coincident with the center of the recognized face image 101. If no face image is recognized in the face recognition process at step S202, the wide focus detection area 12a and the narrow focus detection area 12b (that are shown in FIGS. 2A and 3A), the positions of which are fixed with respect to the light receiving surface 12, are set when the currently-set contrast AF mode is in the multi-point AF mode and the spot AF mode, respectively.

Subsequently, a first focus initializing process (see FIG. 10A) is performed (step S205). In the first focus initializing process, depending on whether or not the face image area 12G of the recognized face image 101 has become greater when the currently-set contrast AF mode is in the face recognition AF mode, or depending on whether or not the current position of the focusing lens group L1 is closer to the near extremity when the digital camera is in either the multi-point AF mode or the spot AF mode when no face image is recognized, a sequence of operations for determining the search start extremity and the search end extremity of the focusing lens group L1 in the focus search operation, for determining the range of movement of the focusing lens group L1 in the focus search operation, and for moving the focusing lens group L1 to the search start extremity are performed.

Subsequently, image data at the search start position of the focusing lens group L1 in the focus search operation is captured, and thereupon a contrast value calculating process is performed (step S207). Namely, based on the imaged at a input from the image pickup device 11, the contrast value P[0] at the search start position of the focusing lens group L1 is calculated, and the maximum contrast value and the minimum contrast value are updated. Subsequently, the AF motor 25 is driven by one step in the direction to move the focusing lens group L1 toward the search end extremity (step S209), and the lens-position pulse number PN is incremented by one (step S211).

Subsequently, a contrast value P[PN] is calculated in accordance with image data input from the image pickup device 11, and the maximum contrast value and the minimum contrast value are updated (step S213). Subsequently, a peak check process (see FIGS. 13 and 14) is performed which determines whether or not the contrast value P[PN] calculated at step S213 is a peak contrast value which satisfies preset conditions (step S215). The contrast value calculating process at step S213 and the peak check process at step S215 are performed on all the focus detection areas and the support areas which are selected at step S204.

Subsequently, it is determined whether or not the midway-stop OK flag is "1" (step S217). If the midway-stop OK flag is not "1" (if NO at step S217), it is determined whether or not the focusing lens group L1 has reached the search end extremity (step S219). If the focusing lens group L1 has not reached the search end extremity (if NO at step S219), control returns to step S209, so that the operations at steps S209 through S217 and step S219 are repeated while the focusing lens group L1 is moved stepwise toward the search end extremity.

If the midway-stop OK flag is "1" (if YES at step S217) or if the focusing lens group L1 has reached the search end extremity thereof (if YES at step S219), a peak calculation process for calculating a peak contrast value (by linear approximation) is performed in accordance with the five contrast values at consecutive five lens positions which are obtained in the loop process at steps S209 through S219 (step S223). Namely, an estimated more-precise peak contrast value and the position of the focusing lens group L1 at which this more-precise peak contrast value is obtained are calculated by linear approximation because there is a possibility of a real peak contrast value existing in the vicinity of a peak contrast value among the contrast values respectively calculated at the stepping positions.

Subsequently, an area selection process is performed at step S225. In the area selection process, the focus detection area 12F is selected if the digital camera is in the face recognition AF mode and the focus detection area SM0 is selected if the digital camera is in the face recognition AF mode and the spot AF mode. If the currently-set contrast AF mode is in the multi-point AF mode, one of the five focus detection areas MM0 through MM4 in which a value at the closest distance is obtained in accordance with the peak contrast value obtained at each focus detection area is selected as an in-focus area while the position of the focusing lens group L1 at which this valve is obtained is selected. Subsequently, an AF-result storing process is performed, in which the result of whether or not a face image has been recognized, the result of an AF result (in-focus or out-of-focus), the CCD drive mode, and the current time are stored (step S227).

Thereafter, it is determined whether or not the face partial AF search flag (FacePartialAF flag) is "1" and the focus state is an out-of-focus state (step S229). If the face partial AF search flag is not "1" or the focus state is not an out-of-focus state (if NO at step S229; i.e., if the face partial AF search flag is "1" and the focus state is an in-focus state, or if the face partial AF search flag is not "1" regardless of the focus state), a focusing drive process in which the focusing lens group L1 is moved to the lens position thereof, at which a peak contrast value is obtained in the aforementioned selected in-focus area regardless of whether the focus state is an in-focus state or an out-of-focus state, is performed (step S239). Thereafter, control returns to the main process.

If the face partial AF search flag is "1" and the focus state is an out-of-focus state (if YES at step S229), an initialization process similar to the initialization process performed at step S201 is performed (step S231), a midway stop method determining process similar to the midway stop method determining process performed at step S203 is performed (step S233), the face partial AF search flag is set to "0" (step S235), a second focus initializing process (see FIG. 10) is performed (step S237), and control returns to step S207. The second focus initializing process is identical to the first focus initializing process except that the face partial AF check process that is performed at step S403 in the first focus initializing process is not performed in the second focus initializing process. Namely, if the focus state is an out-of-focus state as a result of performing a face partial focus search process (operations at steps S407 and S409 through S413 or operations at steps S407 and S415 through S419 shown in FIG. 10), a normal contrast AF process is performed.

[Determination of Midway Stop Method]

Figure 8:
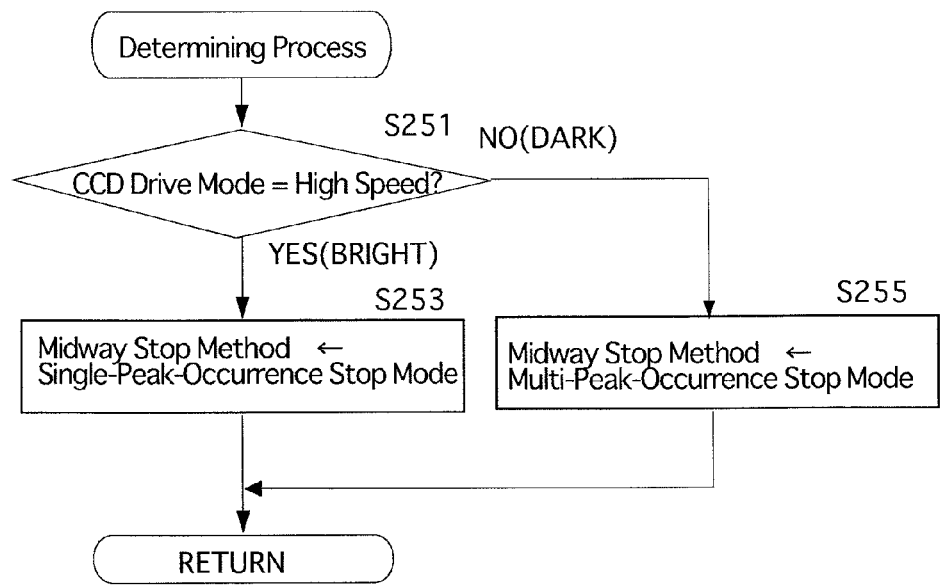
FIG. 8 is a flow chart showing a sub-routine "midway stop method determining process" performed in the contrast AF process shown in FIG. 7.

The midway stop method determining process that is performed at steps S203 and S233 will be hereinafter discussed in detail with reference to the flow chart shown in FIG. 8.

In the midway stop method determining process, firstly it is determined whether or not the currently-set CCD drive mode is the CCD high-speed drive mode (step S251). The image pickup device 11 operates in the CCD high-speed drive mode (short-time exposure mode) when object brightness is equal to or higher than a predetermined value, or operates in the CCD low-speed drive mode (long-time exposure mode) when object brightness is lower than the predetermined value.

In the case of the CCD high-speed drive mode (if YES at step S251), i.e., in the case of a bright object, the single-peak-occurrence stop mode is set (at step S253) and control returns. In the case of the CCD low-speed drive mode (if NO at step S251), i.e., in the case of a dark object, the multi-peak-occurrence stop mode is set (at step S255) and control returns.

In the single-peak-occurrence stop mode, the focus search operation is terminated upon a peak contrast occurring in any of the five focus detection areas MM0 through MM4 in the case of the multi-point AF mode, or the focus search operation is terminated upon a peak contrast occurring in the focus detection area SM0 in the case of the spot AF mode. In the multi-peak-occurrence stop mode, the focus search operation is terminated immediately after a peak contrast occurs in any of the five focus detection areas MM0 through MM4, and a peak contrast occurs in either of the associated two support areas (MS0 and MS1, MS0 and MS2, MS1 and MS3, MS2 and MS4, or MS3 and MS5) at the same time in the case of the multi-point AF mode, or the focus search operation is terminated immediately after a peak contrast occurs in the focus detection area SM0 and a peak contrast occurs in either of the two support areas SS0 and SS1 at the same time in the case of the spot AF mode.

In the case of the face partial focus search process, the single-peak-occurrence stop mode is set irrespective of the CCD drive mode.

[Focus Detection Area Determination Process]

Figure 9:
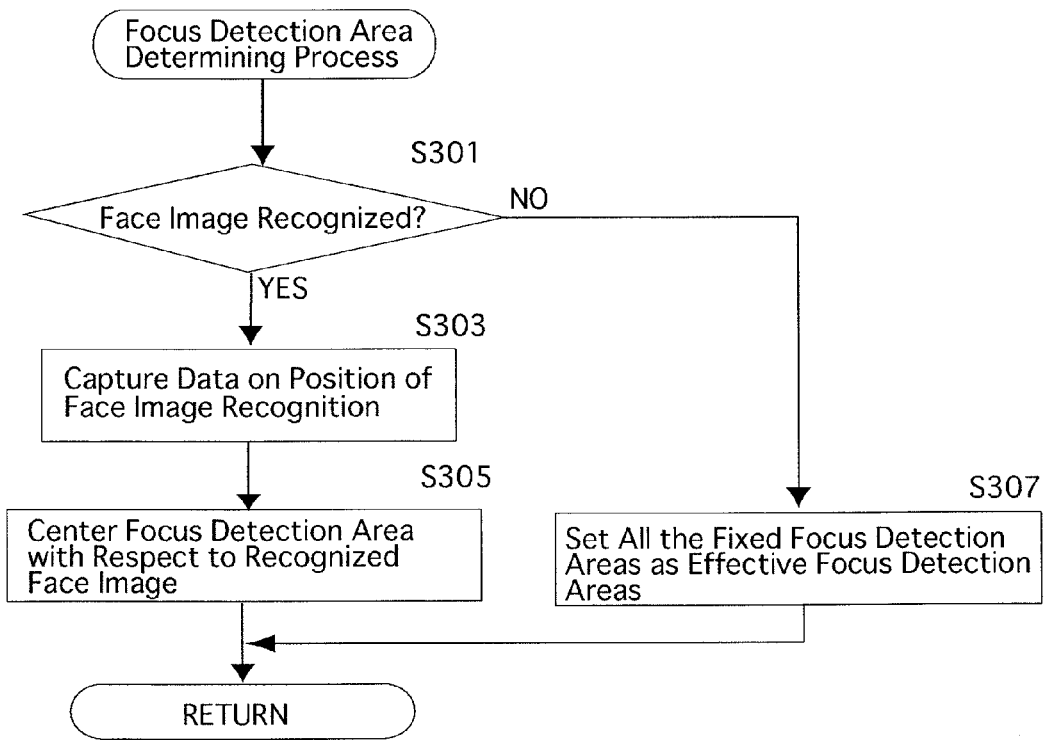
FIG. 9 is a flow chart showing a sub-routine "focus detection area determining process" performed in the contrast AF process shown in FIG. 7.

The focus detection area determination process that is performed at step S204 will be discussed in detail with reference to the flow chart shown in FIG. 9. In this process, firstly it is determined whether or not a face image has been recognized at the face recognition process at step S202 (step S301). If a face image has been recognized (if YES at step S301), data on the position at which the face image has been recognized is input (step S303). Thereafter, the focus detection area 12F that is used in the face recognition AF mode is set (step S305) and control returns. FIG. 4C shows the focus image 101 and the focus detection area 12F by way of example.

If no face image has been recognized (if NO at step S301), the wide focus detection area 12a and the narrow focus detection area 12b, the positions of which are fixed with respect to the light receiving surface 12, are set as shown in FIGS. 4A and 4B when the currently-set contrast AF mode is in the multi-point AF mode and the spot AF mode, respectively (step S307), and control returns.

[First Initializing Process and Second Focus Initializing Process]

The first focus initializing process and the second focus initializing process that are respectively performed at step S205 and S237 in the contrast AF process will be discussed in detail with reference to the flow chart shown in FIG. 10. The difference between the first and second focus initializing processes is in that the operation at step S401 and the face partial AF check process at step S403 that are performed in the first focus initializing process are skipped in the second focus initializing process.

In the first focus initializing process, firstly it is determined whether or not a face image has been recognized at the face recognition process at step S202 (step S401). If a face image has been recognized (if YES at step S401), the face partial AF check process (see FIG. 11) is performed (step S403) and control proceeds to step S405. If no face image has been recognized (if NO at step S401), control skips step S403 to proceed to step S405. The face partial AF search flag (FacePartialAF flag) is set to "1" if all the following predetermined conditions are satisfied in the face partial AF check process and "0" if not all the following predetermined conditions are satisfied in the face partial AF check process, i.e., a condition that a face image has been recognized in the previous contrast AF process, a condition that this recognized face image has been brought into focus in the previous contrast AF process, a condition that a lapse of time since the moment an in-focus state is obtained in the previous contrast AF process is shorter than a predetermined period of time, a condition that the currently-set CCD drive mode (CCD high-speed drive mode or CCD low-speed drive mode) is the same as the previously-set CCD drive mode, and a condition that the center of the currently-recognized face image is located within a predetermined tolerance range from the center of the face image recognized in the previous contrast AF process. In the flow chart shown in FIG. 10A, operations at and after step S405 are common to the first and second focus initializing processes.

At step S405, it is determined whether or not the face partial AF search flag (FacePartialAF flag) is "1" (step S405). If the face partial AF search flag (FacePartialAF flag) is "1" (if YES at step S405), it is determined whether or not the face image area 12Ga of the currently-recognized face image 101 is greater in size than the face image area 12Ga of the previously recognized face image 101, i.e., the face image area previously written in the internal RAM 15b (step S407).

If the face image area 12Ga of the currently-recognized face image 101 is greater in size than the face image area 12Ga of the previously recognized face image 101 (if YES at step S407), a lens drive process is started in which the focusing lens group L1 is moved from the current position thereof toward the infinite focus position, up to the position which corresponds to the lens-position pulse number PN of the current position of the focusing lens group L1 to which a second predetermined pulse number B is added (step S409), the lens position which corresponds to the lens-position pulse number PN of the current position of the focusing lens group L1 from which a first predetermined pulse number A is subtracted is set as the search end extremity of the focusing lens group L1 (step S411), the direction of the focus search operation is set to the direction from the infinite focus position toward the closest focus position (step S413), and control proceeds to step S437. This sequence of operations is diagrammatically shown in FIG. 5B. The first predetermined pulse number A is greater than the second predetermined pulse number B (i.e., A>B).

If it is determined at step S407 that the face image area 12Ga of the currently-recognized face image 101 is smaller in size than the face image area 12Ga of the previously recognized face image 101 (if NO at step S407), a lens drive process is started in which the focusing lens group L1 is moved from the current position thereof toward the closest focus position, up to the position which corresponds to the lens-position pulse number PN of the current position of the focusing lens group L1 from which the second predetermined pulse number B is subtracted (step S415), the lens position which corresponds to the lens-position pulse number PN of the current position of the focusing lens group L1, to which the first predetermined pulse number A is added, is set as the search end extremity of the focusing lens group L1 (step S417), the direction of the focus search operation is set to the direction from the closest focus position toward the infinite focus position (step S419), and control proceeds to step S437. This sequence of operations is diagrammatically shown in FIG. 5C.

At step S437, it is determined whether or not the focusing lens group L1 has reached the search start extremity, i.e., whether the AF motor 25 has stopped. If it is determined that the AF motor 25 has stopped (if YES at step S437), control returns.

According to the above described process, if a face image has been recognized and brought into focus by the previous contrast AF process and if the currently-recognized face image is greater in size than the previously-recognized face image, a peak contrast value can be detected with reliability in a short period of time because the range of movement of the focusing lens group L1 in the focus search operation is determined to include the current position of the focusing lens group L1 and to make the range of movement of the focusing lens group L1 on the near extremity side thereof wider than that on the far extremity side thereof so that the focus search operation is performed within this widened range of movement of the focusing lens group L1 on the near extremity side thereof.

If a face image has been recognized and brought into focus by the previous contrast AF process and if the currently-recognized face image is smaller in size than the previously-recognized face image, a peak contrast value can be detected with reliability in a short period of time because the range of movement of the focusing lens group L1 in the focus search operation is determined to include the current position of the focusing lens group L1 and to make the range of movement of the focusing lens group L1 on the far extremity side thereof wider than that on the near extremity side thereof so that the focus search operation is performed within this widened range of movement of the focusing lens group L1 on the far extremity side thereof.

If the photographing lens of the digital camera is a zoom lens, the size of an object image changes even if the same object is positioned at the same distance, and accordingly, a correcting operation in which the size of the face image area 12Ga of the previously-recognized face image 101 and the size of the face image area 12Ga of the currently-recognized face image 101 are corrected according to the focal length of the zoom lens at the previous in-focus state and the current focal length of the zoom lens, respectively, is performed when the size of the face image area 12Ga of the currently-recognized face image 101 and the size of the previously-recognized face image 101 are compared with each other.

If the face partial AF search flag (FacePartialAF flag) is not "1" (if NO at step S405), the operations at steps S421 through S435 are performed. More specifically, firstly it is determined whether or not the currently-set contrast AF mode is the multi-point AF mode (step S421). If the currently-set contrast AF mode is the multi-point AF mode (if YES at step S421), a toward-near-extremity drive process is performed (step S425). In the toward-near-extremity drive process, the AF motor 25 is driven in the direction toward the closest focus position to move the focusing lens group L1 to the closest focus position (near extremity). Subsequently, the infinite focus position is set as the search end extremity of the focusing lens group L1 (step S427), the direction of the focus search operation is set to the direction from the closest focus position toward the infinite focus position (step S429), and control proceeds to step S437.

If the currently-set contrast AF mode is not the multi-point AF mode (if NO at step S421), i.e., if the currently-set contrast AF mode is in the spot AF mode, it is determined whether or not the current position of the focusing lens group L1 is in the vicinity of the closest focus position (step S423). If the current position of the focusing lens group L1 is in the vicinity of the closest focus position (if YES at step S423), the toward-near-extremity drive process is performed (step S425), the infinite focus position is set as the search end extremity of the focusing lens group L1 (step S427), the direction of the focus search operation is set to the direction from the closest focus position toward the infinite focus position (step S429), and control proceeds to step S437.

If the current position of the focusing lens group L1 is not in the vicinity of the closest focus position (if NO at step S423), a toward-far-extremity drive process is performed (step S431). In the toward-far-extremity drive process, the AF motor 25 is driven in the direction toward the infinite focus position to move the focusing lens group L1 to the infinite focus position (far extremity). Subsequently, the closest focus position is set as the search end extremity of the focusing lens group L1 (step S433), the direction of the focus search operation is set to the direction from the infinite focus position toward the closest focus position (step S435), and control proceeds to step S437.

Thereafter, control waits for the focusing lens group L1 to reach the search start extremity (the closest focus position or the infinite focus position) to thereby stop the AF motor 25 (if NO at step S437), and control returns if the AF motor 25 has stopped (if YES at step S437).

With the above described first and second focus initializing processes, the focusing lens group L1 is moved to the search start extremity, and the direction of movement of the focusing lens group L1 and the range of movement of the focusing lens group L1 in the focus search operation are determined and set.

[Face Partial AF Check Process]

The face partial AF check process that is performed at step S403 will be hereinafter discussed in detail with reference to the flow chart shown in FIG. 11 and the illustrations shown in FIGS. 12A and 12B that show the light receiving surface 12, the face image 101 and the face image area 12G. In the present embodiment, both the previously-recognized face image 101 shown in FIG. 12A and the currently-recognized image 101 shown in FIG. 12B have been captured.

In the face partial AF check process, it is determined whether or not the face image 101 has been recognized (step S451), it is determined whether or not the recognized face image 101 has been brought into focus (step S453), it is determined whether or not a lapse of time since the moment an in-focus state is obtained in the previous contrast AF process is shorter than a predetermined period of time (step S455), it is determined whether or not the currently-set CCD drive mode is the same as the previously-set CCD drive mode (step S457), and it is determined whether or not the center of the recognized face image 101 is located within a predetermined tolerance range. The face partial AF search flag (FacePartialAF flag) is set to "1" (step S461) in the face partial AF check process if all the conditions at steps 451 through 459 are satisfied (if YES at all steps 451 through 459). The face partial AF search flag (FacePartialAF flag) is set to "0" in the face partial AF check process (step S463) if not all the conditions at steps 451 through 459 are satisfied (if NO at any one of steps 451 through 459). The central point O of the face image 101 is set to be coincident with the central point of the face image area 12G.

[Peak Check Process]

The peak check process that is performed at step S215 will be hereinafter discussed in detail with reference to the flow chart shown in FIGS. 13 and 14. The peak check process is for determining a peak contrast value in each focus detection area from the contrast value P[PN] on each lens-position pulse number PN which is obtained while moving the focusing lens group L1 stepwise. In the present embodiment of the digital camera, based on a group of obtained contrast values P[PN] at consecutive five lens positions (five stepping positions), contrast values at two adjacent lens positions of the focusing lens group L1 are compared with each other successively in the direction from the search start extremity (initial position) toward the search end extremity of the focusing lens group L1, to determine whether or not the contrast value increases two times (first predetermined number of times) consecutively, and subsequently decreases two times (second predetermined number of times) consecutively, i.e., whether or not the contrast value of the middle (third) lens position of the five lens positions is a peak contrast value. Thereafter, in the case where the contrast value increases two times consecutively, and subsequently decreases two times consecutively, the maximum contrast value P[PN] at that time is determined to be a peak contrast (maximum value).

In the peak check process, firstly the current lens-position pulse number PN is assigned as a lens-position pulse number PN (step S501).

Subsequently, the midway-stop check flags set for each focus detection area and the associated support areas are all initialized (set to 0) (steps S502, S503 and S504).

Subsequently, it is determined whether or not the lens-position pulse number PN is greater than 5 (step S505). Namely, it is determined whether or not at least five consecutive positions necessary for calculating five peak contrast values at consecutive five lens positions are within a range in which contrast values can be obtained. If the lens-position pulse number PN is not greater than 5 (if NO at step S505), control proceeds to step S523 shown in FIG. 14. If the lens-position pulse number PN is greater than 5 (if YES at step S505), the operations at steps S507 through S521 are repeated for all the currently-set focus detection areas MM0 through MM4 or the currently-set focus detection area SM0 (i.e., for the currently-set focus detection area 12F, 12a or 12b) (steps S506 through S522).

It is determined whether or not the contrast value increases two times consecutively, and subsequently decreases two times consecutively based on a group of obtained five contrast values at consecutive five lens positions from the immediately preceding lens position (PN-1) to the five preceding lens position (PN-5) (step S507). Otherwise (if NO at step S507), control returns to step S506 so that the operation at step S507 is performed for the subsequent focus detection area.

If the contrast value increases two times consecutively, and subsequently decreases two times consecutively (if YES at step S507), 80 percent of the contrast value (P[PN-3]) of the lens position (PN-3) that becomes a maximum value among the group of obtained five contrast values is assigned to a lower limit value dat0 (step S509). Subsequently, it is determined whether or not a first condition for reliability is satisfied, i.e., whether or not either the contrast value P[PN-5] at the lens position (PN-5), which is one of the opposite end positions of the five lens positions, or the contrast value P[PN-1] at the lens position (PN-1), which is the other of the opposite end positions of the five lens positions, is smaller than the lower limit value dat0 (step S511). Namely, it is determined whether or not the difference between the peak contrast value and each contrast value at the opposite end positions of the five lens positions is sufficiently large. If neither of the contrast value P[PN-5] at the lens position (PN-5) and the contrast value P[PN-1] at the lens position (PN-1) is smaller than the lower limit value dat0 (if NO at step S511), control returns to step S506 so that the operations at steps S507 through S511 are performed for the subsequent focus detection area. This is because it is assumed that the reliability of the peak contrast value is low since the contrast variation is small.

If either the contrast value P[PN-5] at the lens position (PN-5) or the contrast value P[PN-1] at the lens position (PN-1) is smaller than the lower limit value dat0 (if YES at step S511), it is determined whether or not a second condition for reliability is satisfied, i.e., whether or not the difference between the peak contrast value P[PN-3] and the minimum contrast value among all the contrast values obtained by the previous processes performed thus far is greater than 10 percent of the peak contrast value P[PN-3] (step S513). Otherwise (if NO at step S513), control returns to step S506 so that the operations at steps S507 through S513 are performed for the subsequent focus detection area. This is because it is assumed that the reliability of the peak contrast value is low since the peak contrast value is small.

If the difference between the peak contrast value P [PN-3] and the minimum contrast value among all the contrast values obtained by the previous processes performed thus far is greater than 10 percent of the peak contrast value P[PN-3] (if YES at step S513), it is determined whether or not a third condition for reliability is satisfied, i.e., whether or not the peak contrast value P[PN-3] is equal to or greater than the maximum contrast value (step S515).

If the peak contrast value P[PN-3] is not equal to or greater than the maximum contrast value (if NO at step S515), control returns to step S506 so that the operations at steps S507 through S515 are performed for the subsequent focus detection area. If the peak contrast value P[PN-3] is equal to or greater than the maximum contrast value (if YES at step S515), the lens-position pulse number (PN-3) at which the peak contrast value P[PN-3] has been obtained is assigned to a position index INDEX while a peak existence flag STATUS is set to "1" (step S517), and control proceeds to step S519.

It should be noted that the position index INDEX is a variable to which a lens-position pulse number for stopping the focus lens group L1 at a lens position thereof as an in-focus position is assigned, and that the focusing lens group L1 is moved to the position of the lens-position pulse number represented by the set position index INDEX after the focus search operation is terminated. The peak existence flag STATUS is a flag for distinguishing whether or not a peak contrast value has been obtained.

At step S519 it is determined whether or not the contrast values P[PN-5] and P[PN-1], that are obtained at the opposite end positions of consecutive five lens positions at which a group of five contrast values are respectively obtained by the peak check process, are greater than the contrast values P[PN-6] and P[PN], respectively, that are obtained at lens positions immediately after and before the aforementioned opposite end positions at which the contrast values P[PN-5] and P[PN-1] are obtained, respectively. Namely, it is determined whether or not the peak contrast value P[PN-3] is a peak contrast value obtained in the case where the contrast value increases three times consecutively, and subsequently decreases three times consecutively. If the peak contrast value P[PN-3] is such a peak contrast value (if YES at step S519), the midway-stop check flag is set to "1" (step S521) and control proceeds to step S523. If the peak contrast value P[PN-3] is not such a peak contrast value (if NO at step S519), control returns to step S506 so that the operations at steps S507 through S519 are performed for the subsequent focus detection area. Since strict conditions are set up in the case of terminating the focus search operation during the progress thereof, the possibility of an error focusing occurring is low.

Upon the operations at steps S506 through S521 being performed on all the currently-set focus detection areas MM0 through MM4 or the currently-set focus detection area SM0 (i.e., for the currently-set focus detection area 12F, 12a or 12b), control proceeds to step S523 from step S522. It is determined at step S523 whether or not the digital camera is currently in the multi-peak-occurrence stop mode. If the digital camera is not currently in the multi-peak-occurrence stop mode (if NO at step S523), control proceeds to step S543. If the digital camera is currently in the multi-peak-occurrence stop mode (if YES at step S523), control proceeds to step S525. The process from step S525 to S542 is substantially the same as the process from step S505 to step S522, and performed on all the support areas MS0 through MS5 or the support areas SS0 and SS1.

It is determined at step S525 whether or not the lens-position pulse number PN is greater than 5. Namely, it is determined whether or not at least five consecutive positions necessary for calculating five peak contrast values at consecutive five lens positions are within a range in which contrast values can be obtained. If the lens-position pulse number PN is not greater than 5 (if NO at step S525), control proceeds to step S543. If the lens-position pulse number PN is greater than 5 (if YES at step S525), the operations at steps S527 through S541 are repeated for all the support areas MS0 through MS5 or the support areas SS0 and SS1 (step S526 through step S542).

It is determined whether or not the contrast value increases two times consecutively, and subsequently decreases two times consecutively based on a group of obtained five contrast values at consecutive five lens positions from the immediately preceding lens position (PN-1) to the five preceding lens position (PN-5) (step S527). Otherwise (if NO at step S527), control returns to step S526 so that the operation at step S527 is performed for the subsequent support area, or proceeds to step S543 in the case of the last support area (steps S526 through S542, and step S543).

If the contrast value increases two times consecutively, and subsequently decreases two times consecutively (if YES at step S527), 80 percent of the contrast value (P[PN-3]) of the lens position (PN-3) that becomes a maximum value among the group of obtained five contrast values is assigned to the lower limit value dat0 (step S529). Subsequently, it is determined whether or not a first condition for reliability is satisfied, i.e., whether or not either the contrast value P[PN-5] at the lens position (PN-5), which is one of the opposite end positions of the five lens positions, or the contrast value P[PN-1] at the lens position (PN-1), which is the other of the opposite end positions of the five lens positions, is smaller than the lower limit value dat0 (step S531). Namely, it is determined whether or not the difference between the peak contrast value and each contrast value at the opposite end positions of the five lens positions is sufficiently large. If neither of the contrast value P[PN-5] at the lens position (PN-5) and the contrast value P[PN-1] at the lens position (PN-1) is smaller than the lower limit value dat0 (if NO at step S531), control returns to step S526 so that the operations at steps S527 through S531 are performed for the subsequent support area. This is because it is assumed that the reliability of the peak contrast value is low since the contrast variation is small.

If either the contrast value P [PN-5] at the lens position (PN-5) or the contrast value P[PN-1] at the lens position (PN-1) is smaller than the lower limit value dat0 (if YES at step S531), it is determined whether or not a second condition for reliability is satisfied, i.e., whether or not the difference between the peak contrast value P[PN-3] and the minimum contrast value among all the contrast values obtained by the previous processes performed thus far is greater than 10 percent of the peak contrast value P[PN-3] (step S533). Otherwise (if NO at step S533), control returns to step S526 so that the operations at steps S527 through S533 are performed for the subsequent support area. This is because it is assumed that the reliability of the peak contrast value is low since the peak contrast value is small.

If the difference between the peak contrast value P[PN-3] and the minimum contrast value among all the contrast values obtained by the previous processes performed thus far is greater than 10 percent of the peak contrast value P[PN-3] (if YES at step S533), it is determined whether or not a third condition for reliability is satisfied, i.e., whether or not the peak contrast value P[PN3] is equal to or greater than the maximum contrast value (step S535). If the peak contrast value P[PN3] is not equal to or greater than the maximum contrast value (if NO at step S535), control returns to step S526 so that the operations at steps S527 through S535 are performed for the subsequent support area. If the peak contrast value P[PN3] is equal to or greater than the maximum contrast value (if YES at step S535), the lens-position pulse number (PN-3) at which the peak contrast value P[PN-3] has been obtained is assigned to the position index INDEX while the peak existence flag STATUS is set to "1" (step S537), and control proceeds to step S539.

At step S539 it is determined whether or not the contrast values P[PN-5] and P[PN-1], that are obtained at the opposite end positions of consecutive five lens positions at which a group of five contrast values are respectively obtained by the peak check process, are greater than the contrast values P[PN-6] and P[PN], respectively, that are obtained at lens positions immediately after and before the aforementioned opposite end positions at which the contrast values P[PN-5] and P[PN-1] are obtained, respectively. Namely, it is determined whether or not the peak contrast value P[PN-3] is a peak contrast value obtained in the case where the contrast value increases three times consecutively, and subsequently decreases three times consecutively. If the peak contrast value P[PN-3] is such a peak contrast value (if YES at step S539), the midway-stop check flag for support area is set to "1" (step S541) and control proceeds to step S543. If the peak contrast value P[PN-3] is not such a peak contrast value (if NO at step S539), control returns to step S526 so that the operations at steps S527 through S539 are performed for the subsequent support area. Since strict conditions are set up in the case of terminating the focus search operation during the progress thereof, the possibility of an error focusing occurring is low.

At step S543 it is determined whether or not the digital camera is currently in the single-peak-occurrence stop mode. If the digital camera is currently in the single-peak-occurrence stop mode (if YES at step S543), a single-peak-occurrence stop check process (see FIG. 15) is performed (S545), and control returns. If the digital camera is not currently in the single-peak-occurrence stop mode (if NO at step S543), a multi-peak-occurrence stop check process (see FIG. 16) is performed (S547), and control returns.

[Single-Peak-Occurrence Stop Check Process]

Figure 15:
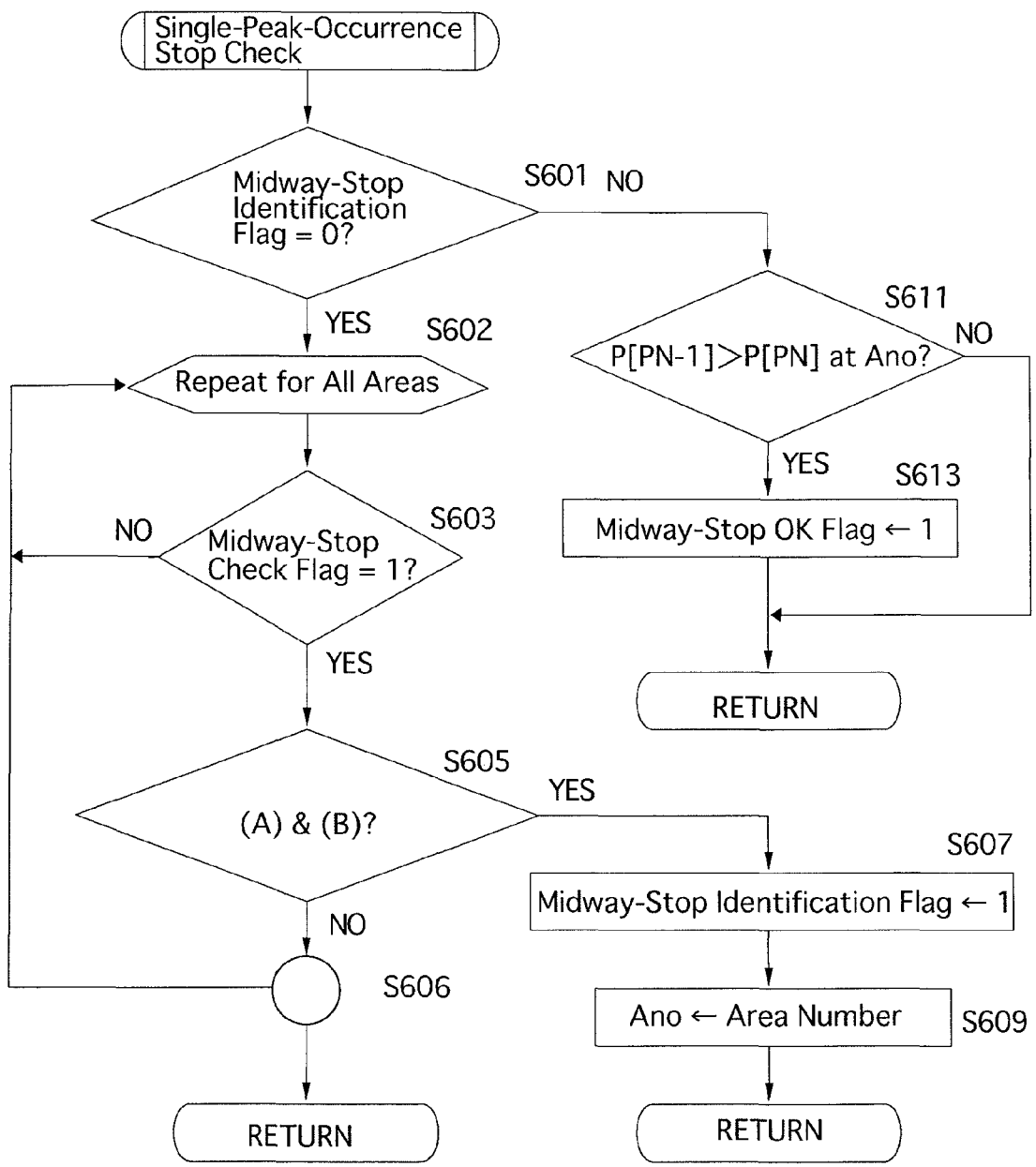
FIG. 15 is a flow chart showing a sub-routine "single-peak-occurrence stop check process" performed in the latter half of the peak check process shown in FIG. 14.

The single-peak-occurrence stop check process that is performed at step S545 will be hereinafter discussed in detail with reference to the flow chart shown in FIG. 15. In this process, firstly it is determined whether or not the midway-stop identification flag is "0" (step S601). The midway-stop identification flag is "0" when control first enters the single-peak-occurrence stop check process, so that control proceeds to a loop process at steps S602 through S606.

In the loop process at steps S602 through S606, it is determined whether or not the midway-stop check flag is "1" for each area (step S603). The area for which the midway-stop check flag is set to "1" is the area on which it is determined that the peak contrast value P[PN-3] is a peak contrast value obtained in the case where the contrast value increases three times consecutively, and subsequently decreases three times consecutively, and for which the midway-stop check flag is set to "1" at step S541. If it is determined at step S603 that the midway-stop check flag is not "1" (if NO at step S603), control returns to step S602 and it is determined whether or not the midway-stop check flag is "1" for the subsequent area (step S603).

If it is determined at step S603 that the midway-stop check flag is "1" (if YES at step S603), it is determined whether or not both the following two conditions (a) and (b) are satisfied (step S605):

(a) No peak contrast exists in the vicinity of the closest focus position (near extremity) of the focusing lens group L1 in any other focus detection area, and (b) A peak contrast exists within plus or minus 1 pulse position even if existing in any other focus detection area.

If both the conditions (a) and (b) are not both satisfied (if NO at step S605), control returns to step S602 so that the operations at steps S603 and S605 are performed for the subsequent area. If all the areas do not satisfy both the two conditions (a) and (b), control returns. If any area satisfies both of the two conditions (a) and (b) (if YES at step S605), the midway-stop identification flag is set to "1" (step S607), the area number of this area is assigned to an area number ANo (step S609), and control returns. Thereafter, the focus detected area represented by the area number ANo is selected as an in-focus area in the area selection process at step S225 (see FIG. 9).

If the midway-stop identification flag is "1" (if NO at step S601), it is determined whether or not the contrast value P[PN] at the current position of the focusing lens group L1 is smaller than the contrast value P[PN-1] at the immediately preceding position of the focusing lens group L1 (step S611). If the contrast value P[PN] is smaller than the contrast value P[PN-1] (if YES at step S611), the midway-stop OK flag is set to "1" (step S613), and control returns. If the contrast value P[PN] is not smaller than the contrast value P[PN-1] (if NO at step S611), control simply returns. It is determined at step S601 that the midway-stop identification flag is "1" when a position of the focusing lens group L1 at which a peak contrast is obtained has been detected and control enters the single-peak-occurrence stop check process for the second time or more, after the midway-stop identification flag is set to "1" at step S607. It is determined at step S611 that the contrast value P[PN] is smaller than the contrast value P[PN-1] when the contrast value decreases four times consecutively from a peak contrast.

[Multi-Peak-Occurrence Stop Check Process]

The multi-peak-occurrence stop check process that is performed at step S547 will be hereinafter discussed in detail with reference to the flow chart shown in FIG. 16. In this process, firstly it is determined whether or not the midway-stop identification flag is "0" (step S701). The midway-stop identification flag is "0" when control first enters the multi-peak-occurrence stop check process, so that control proceeds to a loop process at steps S702 through S708.

In the loop process at steps S702 through S708, it is determined whether or not the midway-stop check flag is "1" for each area in the order thereof (step S703). The area for which the midway-stop check flag is set to "1" is the area on which it is determined that the peak contrast value P[PN-3] is a peak contrast value obtained in the case where the contrast value increases three times consecutively, and subsequently decreases three times consecutively, and for which the midway-stop check flag is set to "1" at step S541. If it is determined at step S703 that the midway-stop check flag is not "1" (if NO at step S703), control returns to step S702 and it is determined whether or not the midway-stop check flag is "1" for the subsequent area (step S703).

If it is determined at step S703 that the midway-stop check flag is "1" (if YES at step S703), it is determined whether or not the midway-stop check flag is "1" for at least one of the two support areas of the currently-checked focus detection area (step S705). If the midway-stop check flag is not "1" for either of the two support areas of the currently-checked focus detection area (if NO at step S705), control returns to step S702 so that the operations at steps S703 and S705 are performed for the subsequent focus detection area.

If it is determined at step S705 that the midway-stop check flag is "1" for at least one of the two support areas of the currently-checked focus detection area (if YES at step S705), it is determined whether or not the above described two conditions (a) and (b) are satisfied (step S707). If both the conditions (a) and (b) are not satisfied (if NO at step S707), control returns to step S702 so that the operations at steps S703 through S707 are performed for the subsequent focus detection area. If none of the focus detection areas satisfy both the two conditions (a) and (b), control returns.

If both the two conditions (a) and (b) are satisfied (if YES at step S707), the midway-stop identification flag is set to "1" (step S709), the area number of this focus detection area is assigned to the area number ANo (step S711), and control returns. Thereafter, the focus detected area represented by the area number ANo is selected as an in-focus area in the area selection process at step S225.

If the midway-stop identification flag is "1" (if NO at step S701), it is determined whether or not the contrast value P[PN] at the current position of the focusing lens group L1 is smaller than the contrast value P[PN-1] at the immediately preceding position of the focusing lens group L1 (step S713). If the contrast value P[PN] is smaller than the contrast value P[PN-1] (if YES at step S713), the midway-stop OK flag is set to "1" (step S715), and control returns. If the contrast value P[PN] is not smaller than the contrast value P[PN-1] (if NO at step S713), control simply returns. It is determined at step S701 that the midway-stop identification flag is "1" when a position of the focusing lens group at which a peak contrast is obtained has been detected and control enters the multi-peak-occurrence stop check process for the second time or more, after the midway-stop identification flag is set to "1" at step S709. It is determined at step S713 that the contrast value P[PN] is smaller than the contrast value P[PN-1] when the contrast value decreases four times consecutively from a peak contrast.

Figure 7:
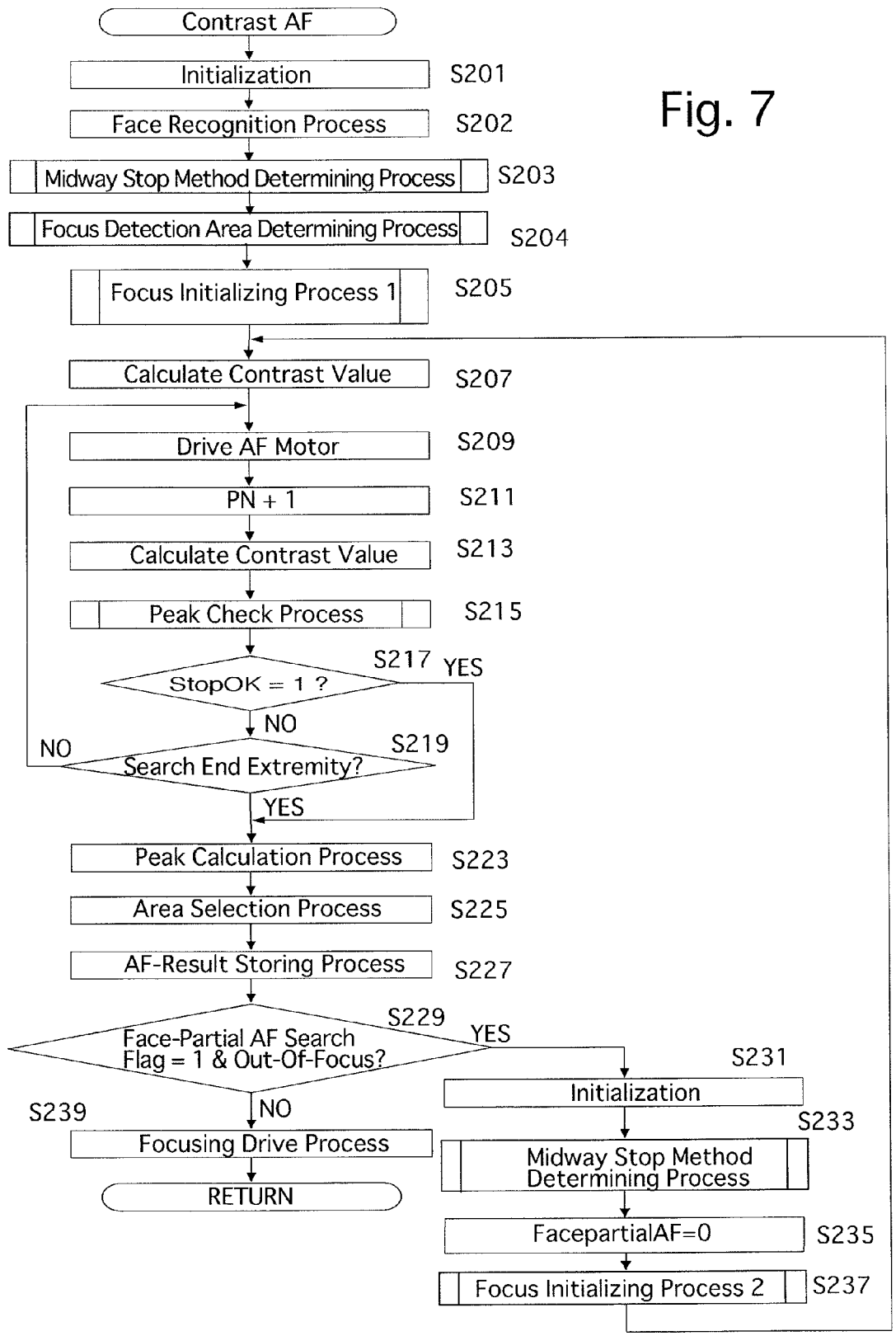
FIG. 7 is a flow chart showing a sub-routine "contrast AF process" performed in the main process shown in FIG. 6.

If the midway-stop OK flag is set to "1" by the single-peak-occurrence stop check process or the multi-peak-occurrence stop check process, control returns to the contrast AF process shown in FIG. 7, goes from step S217 to step S223, and control ends via steps S225 through S229 and S239 in order to complete the focus search process.

Figure 10A:
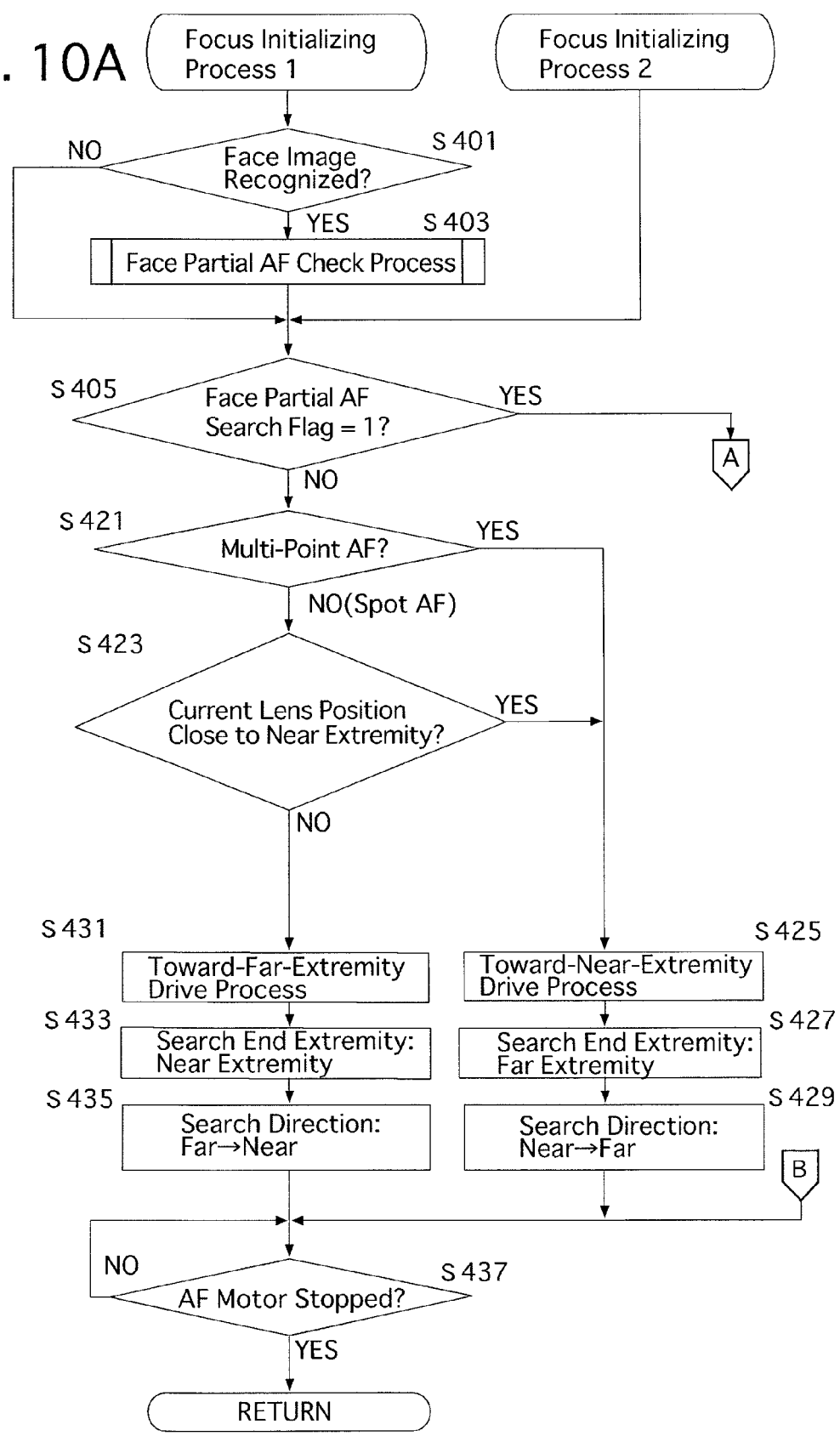
Figure 11:
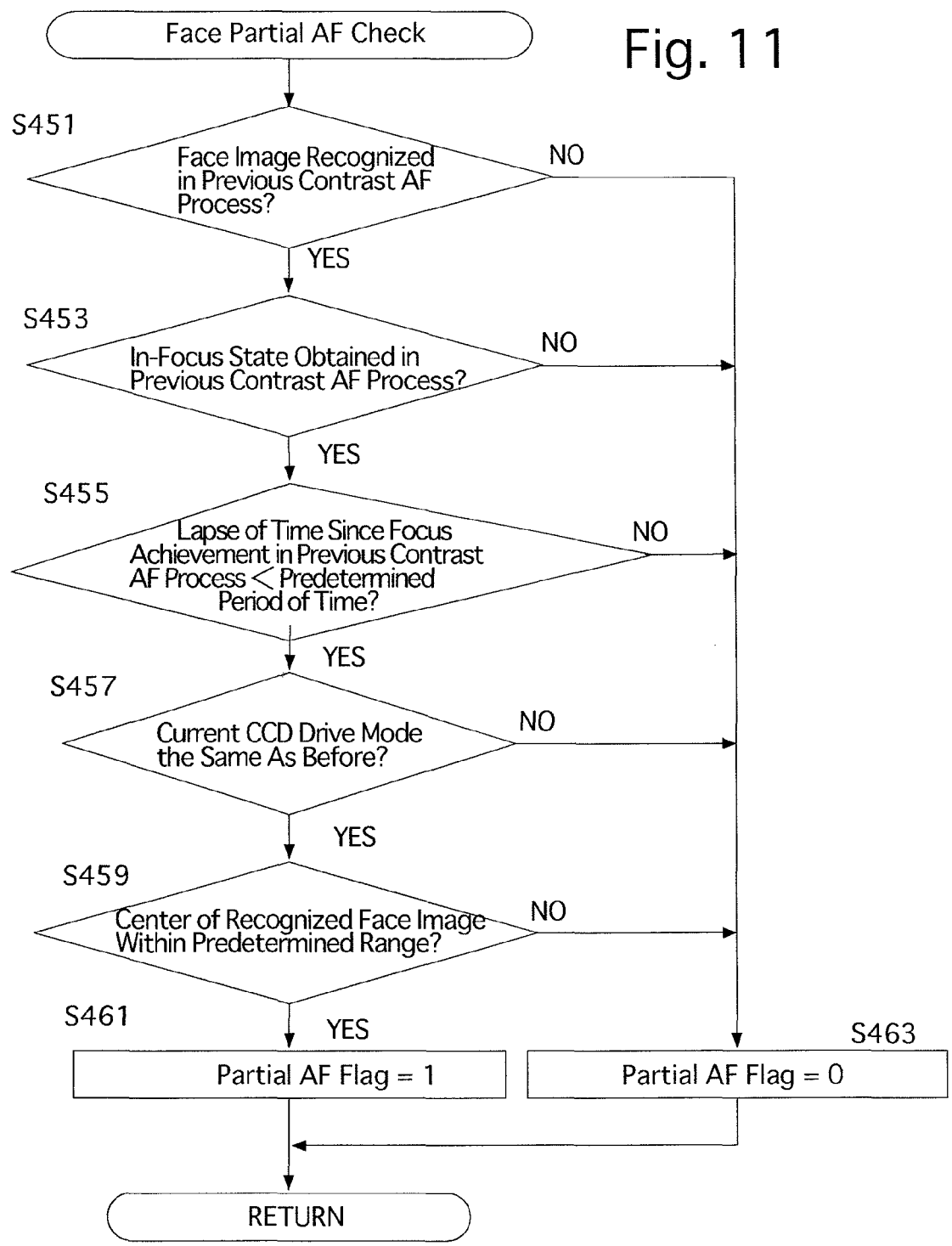
FIG. 11 is a flow chart showing a sub-routine "face partial AF check process" performed in the first focus initializing process shown in FIG. 10A.
Figure 12A:
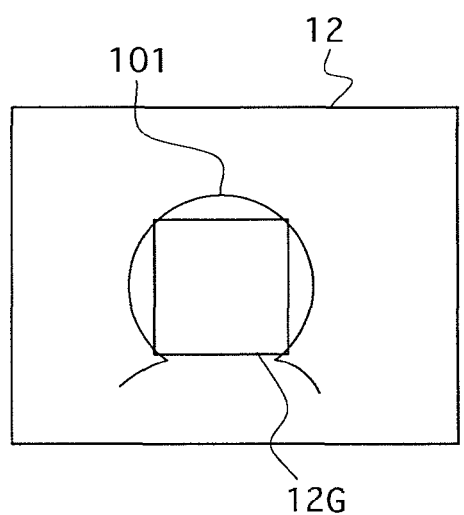
Figure 12B:
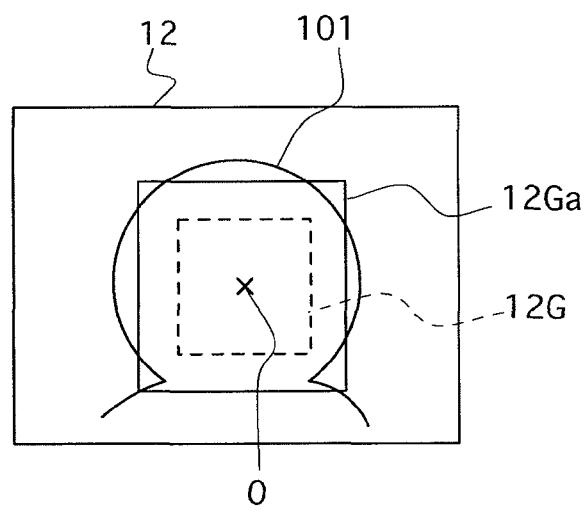

In the present invention as described above, in the case where a contrast AF process is performed again after a face image is recognized and brought into focus once, the partial AF is set to 1 at step S461 in FIG. 11 which is performed at step S205 in FIG. 7 and step S403 in FIG. 10A. Thereafter control proceeds from step S405 of FIG. 10A to the processes in FIG. 10B, wherein the focus search range is adjusted.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera having a focus adjusting system and a face recognition function, comprising:
    a controller for controlling operations of a said focus adjusting system and for performing said face recognition function;
    a photographing optical system including a focusing lens group movable along an optical axis direction;
    an image pickup device;
    a focus adjusting device, which performs a focus search process in which said image pickup device is activated to capture an object image at each of a plurality of different positions of said focusing lens group in said optical axis direction while said focusing lens group is moved along said optical axis direction to detect a position of said focusing lens group in said optical axis direction as an in-focus lens position based on image signals of said object images obtained at said plurality of different positions of said focusing lens group, and in which said focusing lens group is moved to said in-focus lens position detected by said focus search process; and
    a face recognition device for recognizing a first previous face image and a second present face image based on said image signals of said object images,
    a memory for storing said first previous face image and said second present face image;
    wherein, in the case where said face recognition device recognizes said second present face image and said second present face image is stored in said memory, and in the case where an in-focus state was previously achieved on said first previous face image previously recognized by said face recognition device and said first previous face image is stored in said memory, said focus adjusting device determines a range of movement of said focusing lens group in said focus search process based on sizes and positions of said second present face image stored in said memory and said first previous face image stored in said memory when said in-focus state was previously achieved, and said second present face image currently recognized by said face recognition device on a picture plane,
    wherein, said controller is arranged to compare an area said second present face image and an area of said first previous face image,
    wherein, when said area of said second present face image recognized by said face recognition device becoming greater than said area of said first previous face image by a predetermined amount, said focus adjusting device determines a range of movement of said focusing lens group as a limited range from a position closer to said near extremity than a current stop position of said focusing lens group by a first predetermined amount to a position closer to a far extremity than said current stop position of said focusing lens group by a second predetermined amount which is smaller than said first predetermined amount, and
    wherein said focus adjusting device performs said focus search process so that said focus lens group moves in a direction from the far extremity toward the near extremity within said limited range.

2. The camera having a focus adjusting system and a face recognition function according to claim 1,
    wherein said face recognition device recognizes said second present face image and an in-focus state previously achieved on said first previous face image previously recognized by said face recognition device as a result of an AF process being performed upon said focus adjusting device receiving an AF start command.

3. The camera having a focus adjusting system and a face recognition function according to claim 1,
    wherein said focus adjusting device determines said range of movement of said focusing lens group in said focus search process when a lapse of time since said previous focus achievement is shorter than a predetermined period of time.

4. The camera having a focus adjusting system and a face recognition function according to claim 1,
    wherein, in the case where said focus search process previously performed is performed on said second present face image recognized by said face recognition device, said focus adjusting device determines said range of movement of said focusing lens group in said focus search process when a center of said second present face image is located within a predetermined range from a center of said first previous face image.

5. The camera having a focus adjusting system and a face recognition function according to claim 1,
    wherein said focus adjusting device performs said focus search operation so that said focusing lens group moves over an entire range of movement thereof in the case where said focus adjusting device fails to detect said in-focus lens position of said focusing lens group within said range of movement of said focusing lens group that is determined by said focus adjusting device.

6. The camera having a focus adjusting system a face recognition function according to claim 1,
    wherein said photographing optical system comprises a zoom lens, and wherein said camera further comprises a compensating device which corrects a size of a face image area of said first previous face image and a size of a face image area of said second present face image according to a focal length at a previous in-focus state and a current focal length of said zoom lens, respectively, when said size of said face image area of said second present face image and said size of said face image area of said first previous face image are compared with each other.

7. A digital camera having a face recognition function, comprising:
    a controller for controlling operations of a said focus adjusting system and for performing said face recognition function;
    a photographing optical system including a focusing lens group movable along an optical axis direction;
    a focus adjusting device, which captures an object image via an image pickup device at each of a plurality of different positions of said focusing lens group in said optical axis direction while moving said focusing lens group along said optical axis direction to detect a position thereof as an in-focus lens position based on image signals of said object images obtained at said plurality of different positions, and which moves said focusing lens group to said in-focus lens position; and a face recognition device for recognizing a first previous face image and a second present face image based on said image signals of said object images, a memory for storing said first previous face image and said second present face image;

wherein, in the case where said face recognition device recognizes said second present face image and said second present face image is stored in said memory, and in the case where an in-focus state was previously achieved on said first previous face image previously recognized by said face recognition device and said first previous face image is stored in said memory, said focus adjusting device determines a range of stepwise movement of said focusing lens group based on sizes and positions of said second present face image stored in said memory and said first previous face mage stored in said memory when an in-focus state is previously achieved, and said second present face image currently recognized by said face recognition device, wherein, said controller is arranged to compare an area said second present face image and an area of said first previous face image, wherein, when said area of said second present face image recognized by said face recognition device becoming greater than said area of said first previous face image by a predetermined amount, said focus adjusting device determines said range of movement of said focusing lens group as a limited range from a position closer to said near extremity than a current stop position of said focusing lens group by a first predetermined amount to a position closer to said far extremity than said current stop position of said focusing lens group by a second predetermined amount which is smaller than said first predetermined amount, and wherein said focus adjusting device performs said focus search process so that said focus lens group moves in a direction from the far extremity toward the near extremity within said limited range.

8. A camera having a focus adjusting system and a face recognition function, comprising:

a controller for controlling operations of a said focus adjusting system and for performing said face recognition function;

a photographing optical system including a focusing lens group movable along an optical axis direction;

an image pickup device;

a focus adjusting device, which performs a focus search process in which said image pickup device is activated to capture an object image at each of a plurality of different positions of said focusing lens group in said optical axis direction while said focusing lens group is moved along said optical axis direction to detect a position of said focusing lens group in said optical axis direction as an in-focus lens position based on image signals of said object images obtained at said plurality of different positions of said focusing lens group, and in which said focusing lens group is moved to said in-focus lens position detected by said focus search process; and a face recognition device for recognizing a first previous face image and a second present face image based on said image signals of said object images, a memory for storing said first previous face image and said second present face image;

wherein, in the case where said face recognition device recognizes said second present face image and said second present face image is stored in said memory, and in the case where an in-focus state was previously achieved on said first previous face image previously recognized by said face recognition device and said first previous face image is stored in said memory, said focus adjusting device determines a range of movement of said focusing lens group in said focus search process based on sizes and positions of said second present face image stored in said memory and said first previous face image stored in said memory when said in-focus state was previously achieved, and said face image currently recognized by said face recognition device on a picture plane, wherein, said controller is arranged to compare an area said second present face image and an area of said first previous face image, wherein, when said area of said second present face image recognized by said face recognition device becoming smaller than said area of said first previous face image by at least a predetermined amount, said focus adjusting device determines said range of movement of said focusing lens group as a limited range from a position closer to said far extremity than a current stop position of said focusing lens group by a first predetermined amount to a position closer to said near extremity than said current stop position of said focusing lens group by a second predetermined amount which is smaller than said first predetermined amount, and wherein said focus adjusting device performs said focus search process so that said focus lens group moves in a direction from the near extremity toward the far extremity within said limited range.

9. A digital camera having a face recognition function, comprising:

a controller for controlling operations of a said focus adjusting system and for performing said face recognition function;

a photographing optical system including a focusing lens group movable along an optical axis direction;

a focus adjusting device, which captures an object image via an image pickup device at each of a plurality of different positions of said focusing lens group in said optical axis direction while moving said focusing lens group along said optical axis direction to detect a position thereof as an in-focus lens position based on image signals of said object images obtained at said plurality of different positions, and which moves said focusing lens group to said in-focus lens position; and a face recognition device for recognizing a first previous face image and a second present face image based on said image signals of said object images, a memory for storing said first previous face image and said second present face image;

wherein, in the case where said face recognition device recognizes said second present face image and said second present face image is stored in said memory, and in the case where an in-focus state was previously achieved on said first previous face image previously recognized by said face recognition device and said firs previous face image is stored in said memory, said focus adjusting device determines a range of stepwise movement of said focusing lens group based on sizes and positions of said second present face image stored in said memory and said first previous face image stored in said memory when an in-focus state is previously achieved and said second present face image currently recognized by said face recognition device, wherein, said controller is arranged to compare an area said second present face image and an area of said first previous face image, wherein, when said area of said second present face image recognized by said face recognition device becoming smaller than said area of said first previous face image by at least a predetermined amount, said focus adjusting device determines said range of movement of said focusing lens group as a limited range from a position closer to said far extremity than a current stop position of said focusing lens group by a first predetermined amount to a position closer to said near extremity than said current stop position of said focusing lens group by a second predetermined amount which is smaller than said first predetermined amount, and wherein said focus adjusting device performs said focus search process so that said focus lens group moves in a direction from the near extremity toward the far extremity within said limited range.

* * * * *